US012075038B2

(12) United States Patent
Liu et al.

(10) Patent No.: US 12,075,038 B2
(45) Date of Patent: *Aug. 27, 2024

(54) SELECTIVE USE OF ALTERNATIVE INTERPOLATION FILTERS IN VIDEO PROCESSING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,582

(22) Filed: Oct. 31, 2022

(65) Prior Publication Data

US 2023/0076783 A1 Mar. 9, 2023

Related U.S. Application Data

(63) Continuation of application No. 17/568,471, filed on Jan. 4, 2022, now Pat. No. 11,503,288, and a
(Continued)

(30) Foreign Application Priority Data

Aug. 20, 2019 (WO) ................ PCT/CN2019/101541

(51) Int. Cl.
*H04N 19/587* (2014.01)
*H04N 19/117* (2014.01)
(Continued)

(52) U.S. Cl.
CPC ......... *H04N 19/117* (2014.11); *H04N 19/132* (2014.11); *H04N 19/176* (2014.11); *H04N 19/523* (2014.11); *H04N 19/80* (2014.11)

(58) Field of Classification Search
CPC ..... H04N 19/82; H04N 19/117; H04N 19/132
See application file for complete search history.

(56) References Cited

U.S. PATENT DOCUMENTS 9,241,160 B2  1/2016  He et al.
9,762,925 B2  9/2017  Fu et al.
(Continued)

FOREIGN PATENT DOCUMENTS

CN    1523567 A    8/2004
CN    102084655 A   6/2011
(Continued)

OTHER PUBLICATIONS

Algorithm description for Versatile Video Coding and Test model Oct. 2018. (Year: 2018).*
(Continued)

*Primary Examiner* — Luis Perez-Fuentes
(74) *Attorney, Agent, or Firm* — Conley Rose, P.C.

(57) ABSTRACT

A method of video processing is described. The method includes determining, for a conversion between a current video block of a current picture of a video and a coded representation of the video, an applicability of an alternative interpolation filter, wherein the applicability of the alternative interpolation filter indicates whether to apply the alternative interpolation filter in the conversion; and performing the conversion based on the determining; wherein the applicability of the alternative interpolation filter is determined based on whether a reference picture resampling in which a reference picture of the current picture is resampled to perform the conversion is used.

20 Claims, 23 Drawing Sheets

Related U.S. Application Data continuation of application No. PCT/CN2020/110147, filed on Aug. 20, 2020.

(51) Int. Cl.
  *H04N 19/132* (2014.01)
  *H04N 19/176* (2014.01)
  *H04N 19/523* (2014.01)
  *H04N 19/59* (2014.01)
  *H04N 19/80* (2014.01)

(56) References Cited

U.S. PATENT DOCUMENTS

| | | | |
|---|---|---|---|
| 9,912,925 | B2 | 3/2018 | Ye et al. |
| 9,924,191 | B2 | 3/2018 | Chen et al. |
| 10,306,240 | B2 | 5/2019 | Xiu et al. |
| 10,341,659 | B2 | 7/2019 | Lee et al. |
| 10,382,781 | B2 | 8/2019 | Zhao et al. |
| 10,440,340 | B2 | 10/2019 | Ye et al. |
| 10,904,565 | B2 | 1/2021 | Chuang et al. |
| 11,166,037 | B2 * | 11/2021 | Chiang ................. H04N 19/44 |
| 11,190,781 | B2 * | 11/2021 | Sarwer ................. H04N 19/30 |
| 11,323,697 | B2 | 5/2022 | Liu et al. |
| 11,503,288 | B2 * | 11/2022 | Liu ....................... H04N 19/132 |
| 11,563,933 | B2 * | 1/2023 | Seregin ................. H04N 19/117 |
| 11,575,887 | B2 * | 2/2023 | Zhang ................... H04N 19/51 |
| 11,671,602 | B2 * | 6/2023 | Zhang ................... H04N 19/70 |
| | | | 375/240.12 |
| 2006/0133507 | A1 | 6/2006 | Lim |
| 2010/0002770 | A1 | 1/2010 | Motta et al. |
| 2010/0074329 | A1 | 3/2010 | Fu |
| 2010/0104214 | A1 | 4/2010 | Tamburrino et al. |
| 2010/0111182 | A1 | 5/2010 | Karczewicz et al. |
| 2011/0080953 | A1 | 4/2011 | Francois et al. |
| 2011/0085742 | A1 | 4/2011 | Maurer |
| 2011/0116546 | A1 | 5/2011 | Guo et al. |
| 2011/0148858 | A1 | 6/2011 | Ni |
| 2011/0200111 | A1 | 8/2011 | Chen et al. |
| 2012/0147963 | A1 | 6/2012 | Sato |
| 2012/0183068 | A1 | 7/2012 | Lou et al. |
| 2013/0034157 | A1 | 2/2013 | Helle et al. |
| 2013/0294518 | A1 | 11/2013 | Lim |
| 2013/0336383 | A1 | 12/2013 | Xu et al. |
| 2013/0343460 | A1 | 12/2013 | Itani et al. |
| 2014/0192862 | A1 | 7/2014 | Flynn |
| 2014/0269926 | A1 | 9/2014 | Oh et al. |
| 2014/0307787 | A1 | 10/2014 | Zheng et al. |
| 2015/0189298 | A1 | 7/2015 | Ye et al. |
| 2015/0229953 | A1 | 8/2015 | Oh et al. |
| 2016/0057420 | A1 | 2/2016 | Pang et al. |
| 2016/0057431 | A1 | 2/2016 | El Chami et al. |
| 2016/0080771 | A1 | 3/2016 | Chen et al. |
| 2016/0261882 | A1 | 9/2016 | Chien |
| 2016/0330474 | A1 | 11/2016 | Liu |
| 2016/0337649 | A1 | 11/2016 | Chuang |
| 2016/0373743 | A1 | 12/2016 | Zhao et al. |
| 2017/0310961 | A1 | 10/2017 | Liu et al. |
| 2018/0077423 | A1 | 3/2018 | Xu et al. |
| 2018/0091816 | A1 | 3/2018 | Chien et al. |
| 2018/0098066 | A1 | 4/2018 | Lee et al. |
| 2018/0115787 | A1 | 4/2018 | Koo |
| 2018/0131932 | A1 | 5/2018 | Lin et al. |
| 2018/0199057 | A1 | 7/2018 | Chuang et al. |
| 2018/0270480 | A1 | 9/2018 | Zhang |
| 2018/0270485 | A1 | 9/2018 | Jang et al. |
| 2018/0288410 | A1 | 10/2018 | Park et al. |
| 2018/0309987 | A1 | 10/2018 | Kim |
| 2018/0376166 | A1 | 12/2018 | Chuang et al. |
| 2019/0238864 | A1 | 8/2019 | Xiu et al. |
| 2019/0379870 | A1 | 12/2019 | Ye et al. |
| 2020/0059658 | A1 | 2/2020 | Chien et al. |
| 2020/0099951 | A1 | 3/2020 | Hung et al. |
| 2020/0112739 | A1 | 4/2020 | Xu |
| 2020/0128250 | A1 | 4/2020 | Lee |
| 2020/0396445 | A1 * | 12/2020 | Seregin ................. H04N 19/105 |
| 2020/0404342 | A1 | 12/2020 | Kotra et al. |
| 2021/0014478 | A1 * | 1/2021 | Seregin ................. H04N 19/132 |
| 2021/0044824 | A1 | 2/2021 | Li et al. |
| 2021/0092425 | A1 | 3/2021 | Li et al. |
| 2021/0243470 | A1 | 8/2021 | Solovyev et al. |
| 2021/0250592 | A1 | 8/2021 | Xiu et al. |
| 2021/0258569 | A1 | 8/2021 | Chen et al. |
| 2021/0274175 | A1 | 9/2021 | Lim et al. |
| 2021/0281852 | A1 | 9/2021 | Ashina et al. |
| 2021/0360228 | A1 | 11/2021 | Kotra et al. |
| 2021/0409702 | A1 | 12/2021 | Wang et al. |
| 2022/0007059 | A1 | 1/2022 | Deng et al. |
| 2022/0014734 | A1 | 1/2022 | Liu et al. |
| 2022/0014790 | A1 | 1/2022 | Liu et al. |
| 2022/0014791 | A1 | 1/2022 | Liu et al. |
| 2022/0060692 | A1 | 2/2022 | Zhang et al. |
| 2022/0060712 | A1 | 2/2022 | Zhang et al. |

FOREIGN PATENT DOCUMENTS

| | | |
|---|---|---|
| CN | 102172022 A | 8/2011 |
| CN | 102461150 A | 5/2012 |
| CN | 102572278 A | 7/2012 |
| CN | 102724498 A | 10/2012 |
| CN | 104869400 A | 8/2015 |
| CN | 105075263 A | 11/2015 |
| CN | 105723676 A | 6/2016 |
| CN | 105847806 A | 8/2016 |
| CN | 105900419 A | 8/2016 |
| CN | 105900425 A | 8/2016 |
| CN | 106331722 A | 1/2017 |
| CN | 106464863 A | 2/2017 |
| CN | 107079161 A | 8/2017 |
| CN | 107787582 A | 3/2018 |
| CN | 107925772 A | 4/2018 |
| CN | 108293111 A | 7/2018 |
| CN | 108353176 A | 7/2018 |
| CN | 108353184 A | 7/2018 |
| CN | 108605124 A | 9/2018 |
| CN | 109076210 A | 12/2018 |
| CN | 113728633 A | 11/2021 |
| EP | 2768221 A1 | 8/2014 |
| EP | 3997873 A1 | 5/2022 |
| JP | 2000059766 A | 2/2000 |
| RU | 2669005 C2 | 10/2018 |
| TW | 201817238 A | 5/2018 |
| WO | 2008148272 A1 | 12/2008 |
| WO | 2015106126 A1 | 7/2015 |
| WO | 2015113510 A1 | 8/2015 |
| WO | 2016109309 A2 | 7/2016 |
| WO | 2017180203 A1 | 10/2017 |
| WO | 2018012933 A1 | 1/2018 |
| WO | 2018155985 A1 | 8/2018 |
| WO | 2018205914 A1 | 11/2018 |
| WO | 2018205954 A1 | 11/2018 |

OTHER PUBLICATIONS

Algorithm description for Versatile Video Coding and Test model Jan. 2019. (Year: 2019).*

Document: JVET-L1002-v2, Chen, J., et al., "Test Model 4 of Versatile Video Coding (VTM 4)," JVET, ISO/IEC JTC1/SC29/WG11 N18275, Jan. 2019, Marrakech, MA, pp. 1-63.

Document: JVET-M0158-v2, Filippov, A., et al., "Non-CE3: LUT-free interpolation filters for intra prediction," Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.

Non-Final Office Action dated Jul. 14, 2023, 28 pages, U.S. Appl. No. 18/165,017, filed Feb. 6, 2023.

Foreign Communication From A Related Counterpart Application, Canadian Application No. 3,135,332, Canadian Office Action dated Jun. 21, 2023, 5 pages.

Document: JVET-O0319r1, Topiwala, P., et al., "Adaptive resolution change (ARC) in VVC," Joint Video Experts Team (JVET) of ITU-T SG 16 WP 3 and ISO/IEC JTC 1/SC 29/WG 11 15th Meeting: Gothenburg, SE, Jul. 3-12, 2019, 7 pages.

(56) References Cited

OTHER PUBLICATIONS

High Efficiency Video Coding, Series H: Audiovisual and Multimedia Systems: Infrastructure of Audiovisual Services Coding of Moving Video, ITU-T Telecommunication Standardization Sector of ITU, H.265, Feb. 2018.
Document: JVET-M1001, Bross et al. "Versatile Video Coding (Draft 4)," Joint Video Experts Team (JVET) of ITU-T SG 16 WP 3 and ISO/IEC UTC 1/SC 29/WG 11 13th Meeting: Marrakech, MA, Jan. 9-18, 2019.
Document: JVET-N0309, Henkel et al. ""Non-CE4: Switched Half-Pel Interpolation Filter,"" Joint Video Experts Team (JVET)of ITU-T SG 16 WP 3 and ISO/IEC JTC 1/SC 29/WG 1114th Meeting: Geneva, CH, Mar. 19-27, 2019.
Document: JVET-K0248, Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 10-18, 2018.
Document: JVET-O2001, Bross et al. "Versatile Video Coding (Draft 6)," Joint Video Experts Team (JVET) of ITU-T SG 16 WP 3 and 1S0/IEC UTC 1/SC 29/WG 1115th Meeting: Gothenburg, SE, Jul. 3-12, 2019.
Document: JVET-P0490, Liu et al. "Non-CE4: Cleanup of Half-Pel Switchable Interpolation Filter," Joint Video Experts Team (JVET)of ITU-T SG 16 WP 3 and 1SO/IEC JTC 1/SC 29/WG 1116th Meeting: Geneva, CH, Oct. 1-11, 2019.
Document: JVET-N0441, Park et al. "CE4-3.3: Candidates optimization on MMVD," Joint Video Experts Team (JVET) of ITU-T SG 16 WP 3 nd ISO/IEC JTC 1/SC 29/WG 1114th Meeting: Geneva, CH, Mar. 19-27, 2019.
Document: JVET-L0266, Zhang et al. "CE4: History-based Motion Vector Prediction (Test 4.4.7)," Joint Video Experts Team (JVET) of ITU-T SG 16 WP 3 and 1SO/IEC JTC 1/SC 29/WG 11, 12th Meeting, Macao, CN, Oct. 3-12, 2018.
Marpe et al. "Context-Based Adaptive Binary Arithmetic Coding in the H.264/AVC Video Compression Standard," IEEE Transactions on Circuits and Systems for Video Technology, Jul. 2003, 13(7):620-636.
Document: JVET-N0605, Chen et al. "Comparative Study of Video Coding Solutions WC, AVI, EVC, Versus HEVC," 126 Motion Picture Experts Group or 1SO/IEC JTC 1/SC 29/WG 11, MPEG Meeting, Mar. 25-26, 2019, Geneva, No. m47482.
Document: JVET-P0332, Choi et al. "AHG8: Signaling and Filtering for Reference Picture Resampling," Joint Video Experts Team (JVET) of TU-T SG 16 WP 3 and ISO/IEC JTC 1/SC 29/WG 11 15th Meeting, Gothenburg, SE Jul. 3-12, 2019.
Document: JVET-L1002-v1, Chen, J., et al., "Algorithm description for versatile video coding and test model 3 (VTM B)," Joint Video Experts Team (JVET) of ITU-T SG 16 WP 3 and ISO/IEC JTC 1/SC 29/WG 11 12th Meeting: Macao, CN, Oct. 3-12, 2018, 40 pages.
Document: JVET-M1002-v1, Chen, J., et al., "Algorithm description for Versatile Video Coding and Test Model 4 (VTM 4)," Joint Video Experts Team (JVET) of ITU-T SG 16 WP 3 and ISO/IEC JTC 1/SC 29/WG 11 13th Meeting: Marrakech, MA, Jan. 9-18, 2019, 63 pages.
NPL Google Search (2022).
Library—USPTO query (2022).
Document: JVET-M1002-v2, Chen, J., et al., "Algorithm description for Versatile Video Coding and Test Model 4 (VTM 4)," Joint Video Experts Team (JVET) of ITU-T SG 16 WP 3 and ISO/IEC JTC 1/SC 29/WG 11 13th Meeting: Marrakech, MA, Jan. 9-18, 2019, 63 pages.
Test Model 4 of Versatile Video Coding (VTM 4) (only website), Jan. 18, 2023.
International Search Report and Written Opinion from International Patent Application No. PCT/CN2020/082754 dated Jul. 2, 2020 (10 pages).
International Search Report and Written Opinion from International Patent Application No. PCT/CN2020/082753 dated Jun. 28, 2020 (11 pages).
International Search Report and Written Opinion from International Patent Application No. PCT/CN2020/082752 dated Jun. 22, 2020 (10 pages).
International Search Report and Written Opinion from International Patent Application No. PCT/CN2020/082747 dated Jun. 30, 2020 (12 pages).
International Search Report and Written Opinion from International Patent Application No. PCT/CN2020/082744 dated Jun. 30, 2020 (10 pages).
International Search Report and Written Opinion from International Patent Application No. PCT/CN2020/110147 dated Nov. 23, 2020 (10 pages).
Non Final Office Action from U.S. Appl. No. 17/484,565 dated Nov. 29, 2021.
Notice of Allowance from U.S. Appl. No. 17/484,636 dated Jan. 20, 2022.
Non Final Office Action from U.S. Appl. No. 17/484,509 dated Nov. 15, 2021.
Notice of Allowance from U.S. Appl. No. 17/484,565 dated Mar. 16, 2022.
Extended European Search Report from European Patent Application No. 20782257.8 dated May 6, 2022 (11 pages).
Extended European Search Report from European Patent Application No. 20854091.4 dated Aug. 12, 2022 (13 pages).
Non-Final Office Action from U.S. Appl. No. 17/568,471 dated Mar. 17, 2022.
Office Action from Singapore Application No. 11202110650W dated Aug. 15, 2022.
Document: JVET-O0240-v1, Samuelsson, J., et al., "AHG 8: Adaptive Resolution Change (ARC) with downsampling," Joint Video Experts Team (JVET) of ITU-T SG 16 WP 3 and ISO/IEC JTC 1/SC 29/WG 11 15th Meeting: Gothenburg, SE, Jul. 3-12, 2019, 13 pages.

* cited by examiner

Candidate pairs considered for redundancy check of spatial merge candidates

Illustration of motion vector scaling for temporal merge candidate

Candidate positions for temporal merge candidate, C0 and C1

Illustration of motion vector scaling for spatial motion vector candidate

```
┌──────────────────────────────┐
│ 1210                         │
│ determining, for a current   │
│ video block, a single set of │
│ motion information based on  │
│ applying at least one        │
│ interpolation filter to a    │
│ set of neighboring blocks,   │
│ wherein the at least one     │
│ interpolation filter is      │
│ configurable to an integer   │
│ pixel or a sub-pixel         │
│ accuracy of the single set   │
│ of motion information        │
└──────────────┬───────────────┘
               │
┌──────────────┴───────────────┐
│ 1220                         │
│ performing a conversion      │
│ between the current video    │
│ block and a bitstream        │
│ representation of the        │
│ current video block, wherein │
│ the conversion includes a    │
│ decoder motion vector        │
│ refinement (DMVR) step for   │
│ refining the single set of   │
│ motion information signaled  │
│ in the bitstream             │
│ representation               │
└──────────────────────────────┘
```

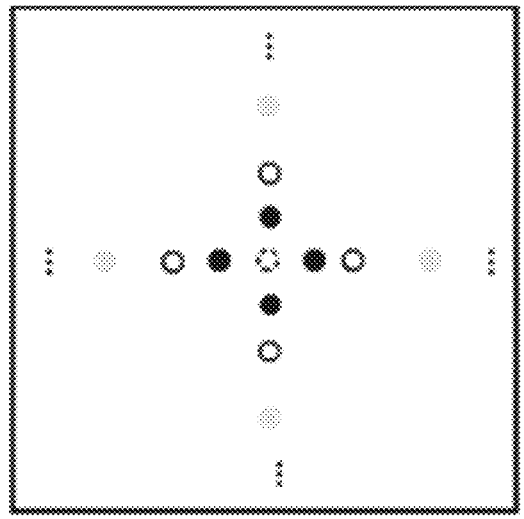
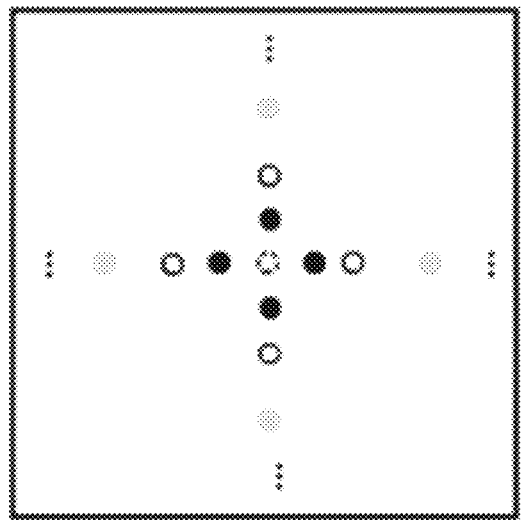
FIG. 13

1450

1452 — Making a first determination that a motion vector difference used in a decoder side motion vector refinement (DMVR) calculation for a first video region had a resolution finer than X-pel resolution and was determined using an alternative half-pel interpolation filter, wherein X is an integer fraction 1454 — Making a second determination, due to the first determination, that information of the alternative half-pel interpolation filter associated with the first video region is not to be stored or made available to a second video region that is subsequently processed 1456 — Performing a conversion between a video comprising the first video region and the second video region and a coded representation of the video based on the first determination and the second determination

*FIG. 14E*

```
                    ┌─────────────────────────┐
              1490  │  Making a first determination that an alternative interpolation
                    │  filter is selected by a first video block of a video for a first motion
                    │  vector component with a X-pel accuracy                          ├─ 1492
                    └─────────────────────────┘
                    ┌─────────────────────────┐
                    │  Making a second determination, due to the first determination,
                    │  that another alternative interpolation filter is used for a second
                    │  motion vector component with an accuracy that is different from ├─ 1494
                    │  the X-pel accuracy, wherein X is an integer fraction
                    └─────────────────────────┘
                    ┌─────────────────────────┐
                    │  Performing a conversion between the video comprising the first
                    │  video block and the second video block and a coded              ├─ 1496
                    │  representation of the video
                    └─────────────────────────┘
```

*FIG. 14I*

SELECTIVE USE OF ALTERNATIVE INTERPOLATION FILTERS IN VIDEO PROCESSING

CROSS REFERENCE TO RELATED APPLICATIONS

This application is a continuation application of U.S. application Ser. No. 17/568,471 filed on Jan. 4, 2022, which is a continuation of International Patent Application No. PCT/CN2020/110147, filed on Aug. 20, 2020, which claims the priority to and benefit of International Patent Application No. PCT/CN2019/101541, filed on Aug. 20, 2019. All of the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to deriving motion vectors (MVs) are described. The described methods may be applied to existing video coding standards (e.g., High Efficiency Video Coding (HEVC) or Versatile Video Coding (VVC)) and future video coding standards or video codecs.

In one representative aspect, the disclosed embodiments may be used to provide a method for video processing. This method includes determining, for a conversion between a current video block of a current picture of a video and a coded representation of the video, an applicability of an alternative interpolation filter, wherein the applicability of the alternative interpolation filter indicates whether to apply the alternative interpolation filter in the conversion; and performing the conversion based on the determining; wherein the applicability of the alternative interpolation filter is determined based on whether a reference picture resampling in which a reference picture of the current picture is resampled to perform the conversion is used.

In another representative aspect, the disclosed embodiments may be used to provide a method for video processing. This method includes determining a coding mode used for representing a current video block of a video as a merge mode with motion vector differences (MMVD) that includes a motion vector expression providing information about a distance between a motion candidate and a starting point; and performing a conversion based on the current video block and a coded representation based on the determining, wherein the conversion is performed using a prediction block for the current video block calculated using a half-pel interpolation filter that is selected according to a first rule that defines a first condition under which the half-pel interpolation filter is an alternative half-pel interpolation filter that is different from a default half-pel interpolation filter and a second rule that defines a second condition about whether the alternative half-pel interpolation filter is inherited.

In another representative aspect, the disclosed embodiments may be used to provide a method for video processing. This method includes determining a coding mode used in a current video region of a video; making, based on the coding mode, a determination about a precision used for representing a motion vector or a motion vector difference value for the current video region; and performing a conversion between the current video block and a coded representation of the video.

In another representative aspect, the disclosed embodiments may be used to provide a method for video processing. This method includes determining a coding mode of a current video block of a video as a merge mode with motion vector differences (MMVD); determining, for the current video block, a distance table that specifies a relationship between a distance index and a predefined offset, based on motion precision information of a base merge candidate associated with the current video block; and performing a conversion between the current video block and a coded representation of the video using the distance table.

In another representative aspect, the disclosed embodiments may be used to provide a method for video processing. This method includes making a first determination that a motion vector difference used in a decoder side motion vector refinement (DMVR) calculation for a first video region had a resolution finer than X-pel resolution and was determined using an alternative half-pel interpolation filter, wherein X is an integer fraction; making a second determination, due to the first determination, that information of the alternative half-pel interpolation filter associated with the first video region is not to be stored or made available to a second video region that is subsequently processed; and performing a conversion between a video comprising the first video region and the second video region and a coded representation of the video based on the first determination and the second determination.

In another representative aspect, the disclosed embodiments may be used to provide a method for video processing. This method includes determining, whether an alternative half-pel interpolation filter is available for a current video block of a video, according to a rule; performing a conversion between the current video block and a coded representation of the video based on the determining; wherein the rule specifies that, in case that the current video block is coded in the coded representation as a merge block or a skip coded block, the determining is independent of whether the alternative half-pel interpolation filter is used for processing a previous block that is encoded or decode prior to the current video block.

In another representative aspect, the disclosed embodiments may be used to provide a method for video processing. This method includes determining, whether an alternative half-pel interpolation filter is available for a current video block of a video, according to a rule; and performing a conversion between the current video block and a coded representation of the video based on the determining, wherein the rule specifies an applicability of the alternative half-pel interpolation filter that is different from a default interpolation filter based on coding information of the current video block.

In another representative aspect, the disclosed embodiments may be used to provide a method for video processing. This method includes determining, for a current video block of a video, coefficients of an alternative half-pel interpolation filter according to a rule; and performing a conversion between the current video block and a coded representation of the video based on the determining, wherein the rule specifies a relationship between the alternative half-pel interpolation filter and a half-pel interpolation filter used in a certain coding mode.

In another representative aspect, the disclosed embodiments may be used to provide a method for video processing. This method includes applying, for a conversion between a current video block of a video and a coded representation of the video, an alternative half-pel interpolation filter according to a rule; and performing a conversion between the current video block and the coded representation of the video, and wherein the rule specifies that the alternative interpolation filter is applied to a position at X-pel, wherein X is other than ½.

In another representative aspect, the disclosed embodiments may be used to provide a method for video processing. This method includes making a first determination that an alternative interpolation filter is selected by a first video block of a video for a first motion vector component with a X-pel accuracy; making a second determination, due to the first determination, that another alternative interpolation filter is used for a second motion vector component with an accuracy that is different from the X-pel accuracy, wherein X is an integer fraction; and performing a conversion between the video comprising the first video block and the second video block and a coded representation of the video.

Further, in a representative aspect, any of the disclosed methods is an encoder-side implementation.

Also, in a representative aspect, any of the disclosed methods is a decoder-side implementation.

One of the above-described methods are embodied in the form of processor-executable code and stored in a computer-readable program medium.

In yet another representative aspect, an apparatus in a video system comprising a processor and a non-transitory memory with instructions thereon is disclosed. The instructions upon execution by the processor, cause the processor to implement any of the disclosed methods.

The above and other aspects and features of the disclosed embodiments are described in greater detail in the drawings, the description and the claims.

BRIEF DESCRIPTION OF THE DRAWINGS

FIG. 12 shows a flowchart of an example method for video processing.

FIG. 13 shows examples of an MMVD search.

FIGS. 14A to 14I show flowcharts of example methods of video processing.

DETAILED DESCRIPTION

1. Video Coding in HEVC/H.265

Figure 1A:
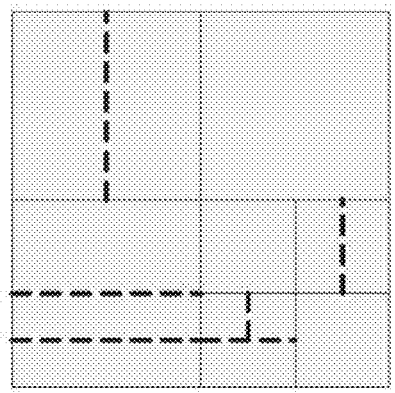
FIGS. 1A and 1B show an illustration of a quadtree plus binary tree (QTBT) block structure.

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

2.1. Quadtree Plus Binary Tree (QTBT) Block Structure with Larger Coding Tree Units In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four picture units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

FIG. 1 shows an illustration of a quadtree plus binary tree (QTBT) block structure. The QTBT structure removes the concepts of multiple partition types, i.e., it removes the separation of the CU, PU and TU concepts, and supports more flexibility for CU partition shapes. In the QTBT block structure, a CU can have either a square or rectangular shape. As shown in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different color components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
   CTU size: the root node size of a quadtree, the same concept as in HEVC
   MinQTSize: the minimum allowed quadtree leaf node size
   MaxBTSize: the maximum allowed binary tree root node size
   MaxBTDepth: the maximum allowed binary tree depth
   MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 1B:
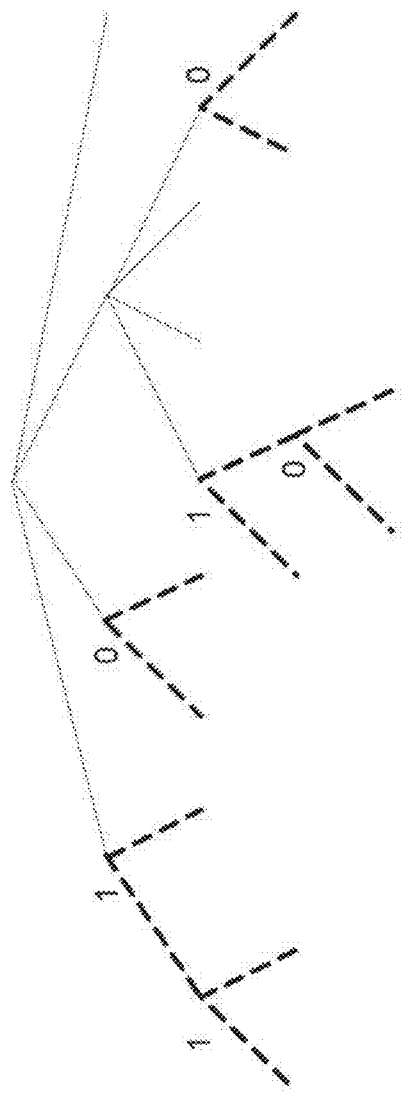

FIG. 1A illustrates an example of block partitioning by using QTBT, and FIG. 1B illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.2. Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such mode is named advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2.1. Merge Mode 2.2.1.1. Derivation of Candidates for Merge Mode

Figure 2:
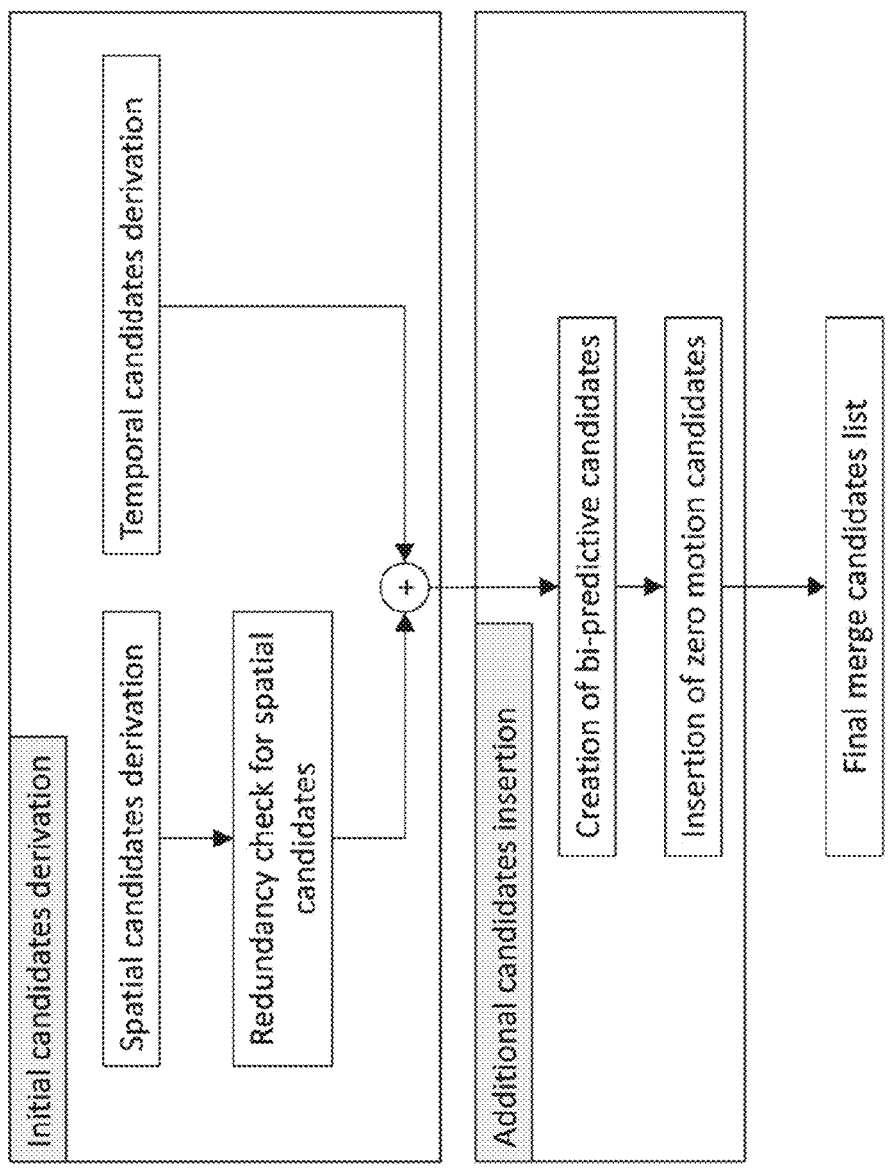
FIG. 2 shows an example of constructing a merge candidate list.

When a PU is predicted using merge mode, an index pointing to an entry in the merge candidates list is parsed from the bitstream and used to retrieve the motion information. The construction of this list is specified in the HEVC standard and can be summarized according to the following sequence of steps:
   Step 1: Initial candidates derivation
      Step 1.1: Spatial candidates derivation
      Step 1.2: Redundancy check for spatial candidates
      Step 1.3: Temporal candidates derivation
   Step 2: Additional candidates insertion
      Step 2.1: Creation of bi-predictive candidates
      Step 2.2: Insertion of zero motion candidates These steps are also schematically depicted in FIG. 2. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2. Spatial Candidates Derivation

Figure 3:
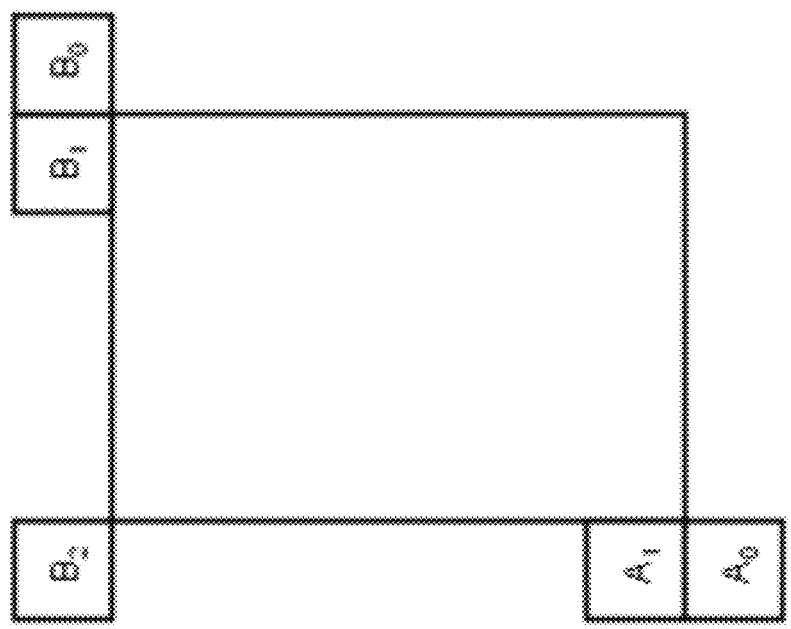
FIG. 3 shows an example of positions of spatial candidates.
Figure 4:
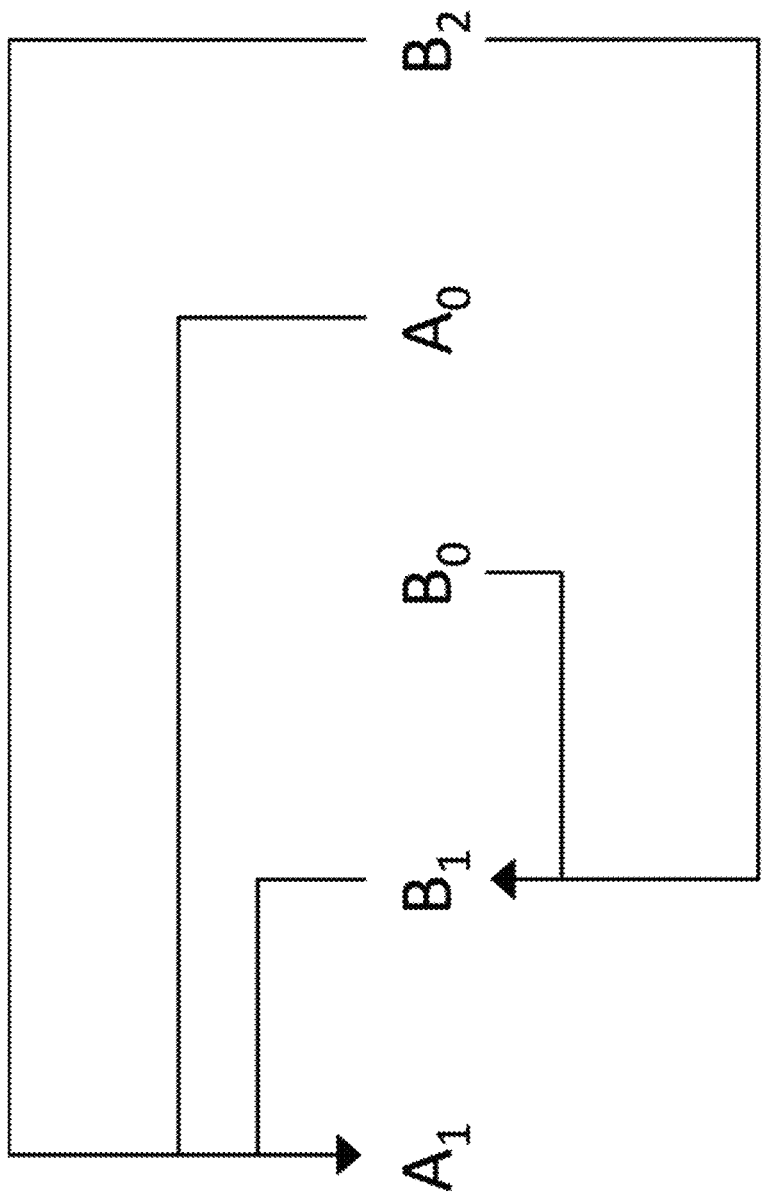
FIG. 4 shows an example of candidate pairs subject to a redundancy check of spatial merge candidates.
Figure 5A:
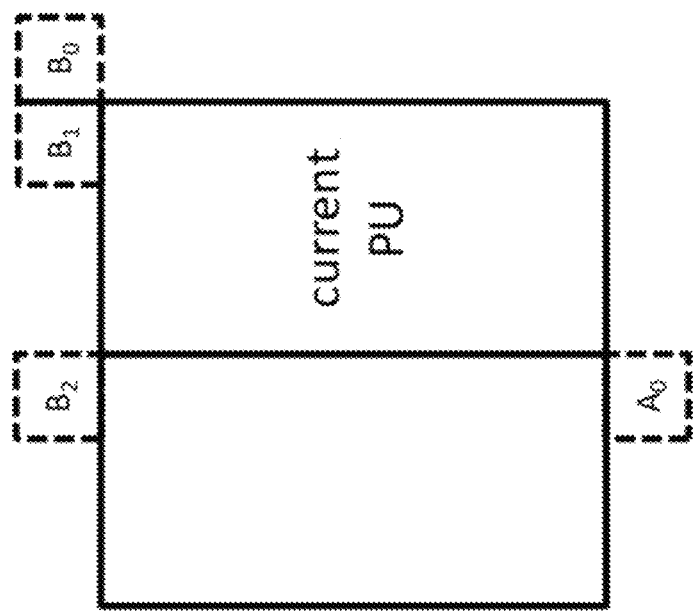
FIGS. 5A and 5B show examples of the position of a second prediction unit (PU) based on the size and shape of the current block.
Figure 5B:
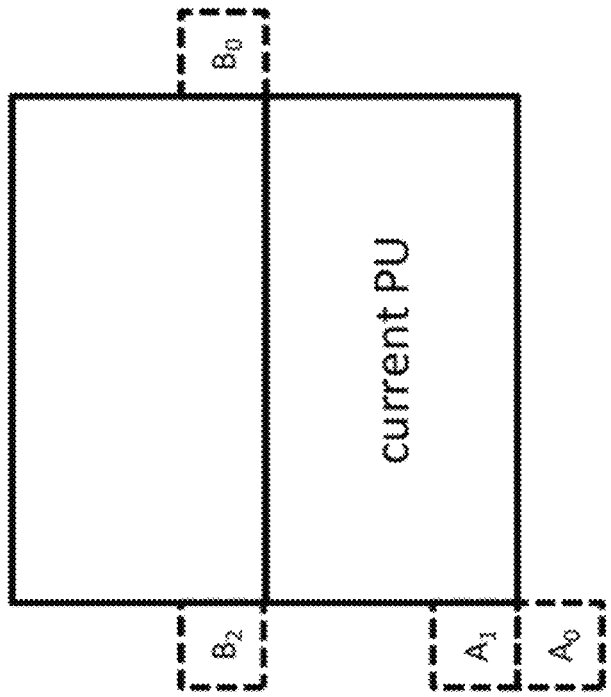

In the derivation of spatial merge candidates, a maximum of four merge candidates are selected among candidates located in the positions depicted in FIG. 3. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead, only the pairs linked with an arrow in FIG. 4 are considered and a candidate is only added to the list if the corresponding candidate used for redundancy check has not the same motion information. Another source of duplicate motion information is the "second PU" associated with partitions different from 2N×2N. As an example, FIG. 5 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3. Temporal Candidates Derivation

Figure 6:
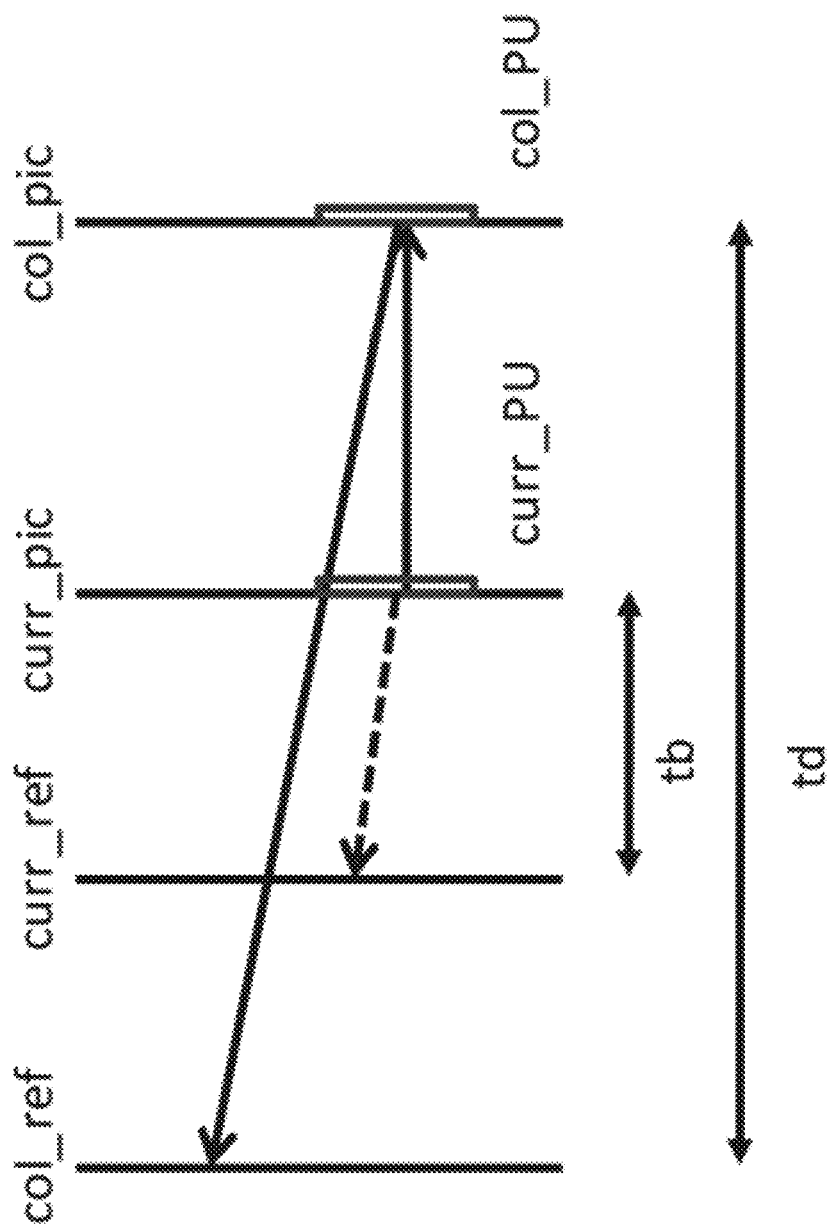
FIG. 6 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signalled in the slice header. The scaled motion vector for temporal merge candidate is obtained as illustrated by the dotted line in FIG. 6, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 7:
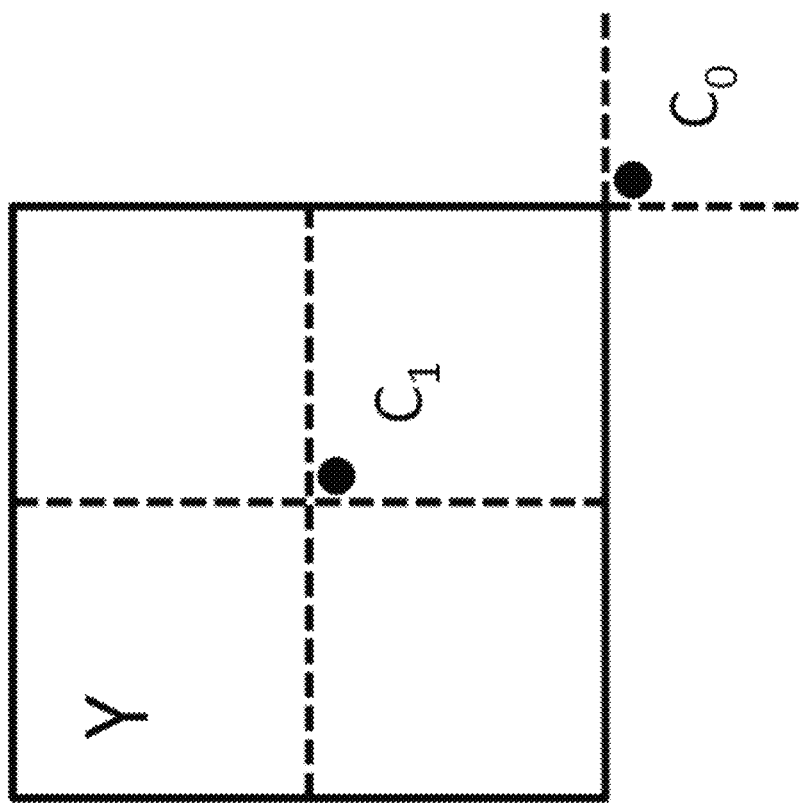
FIG. 7 shows an example of candidate positions for temporal merge candidates.

In the co-located PU (Y) belonging to the reference frame, the position for the temporal candidate is selected between candidates $C_0$ and $C_1$, as depicted in FIG. 7. If PU at position $C_0$ is not available, is intra coded, or is outside of the current CTU row, position $C_1$ is used. Otherwise, position $C_0$ is used in the derivation of the temporal merge candidate.

2.2.1.4. Additional Candidates Insertion

Figure 8:
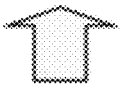
FIG. 8 shows an example of creating a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 8 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.2.2. AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signalling, the index of the best motion vector candidate is encoded using truncated unary. The maximum value to be encoded in this case is 2 (see FIG. 9). In the following sections, details about derivation process of motion vector prediction candidate are provided.

2.2.2.1. Derivation of AMVP Candidates

Figure 9:
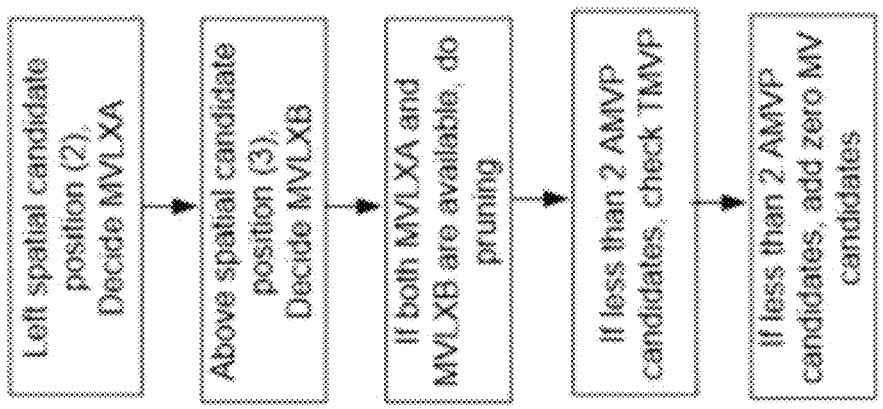
FIG. 9 shows an example of constructing motion vector prediction candidates.

FIG. 9 summarizes a derivation process for motion vector prediction candidates.

In motion vector prediction, two types of motion vector candidates are considered: spatial motion vector candidates and temporal motion vector candidates. For spatial motion vector candidate derivation, two motion vector candidates are eventually derived based on motion vectors of each PU located in five different positions as depicted in FIG. 3.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2. Spatial Motion Vector Candidates

In the derivation of spatial motion vector candidates, a maximum of two candidates are considered among five potential candidates, which are derived from PUs located in positions as depicted in FIG. 3, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there can be four cases used as motion vector candidates, with two cases not associated with spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 10:
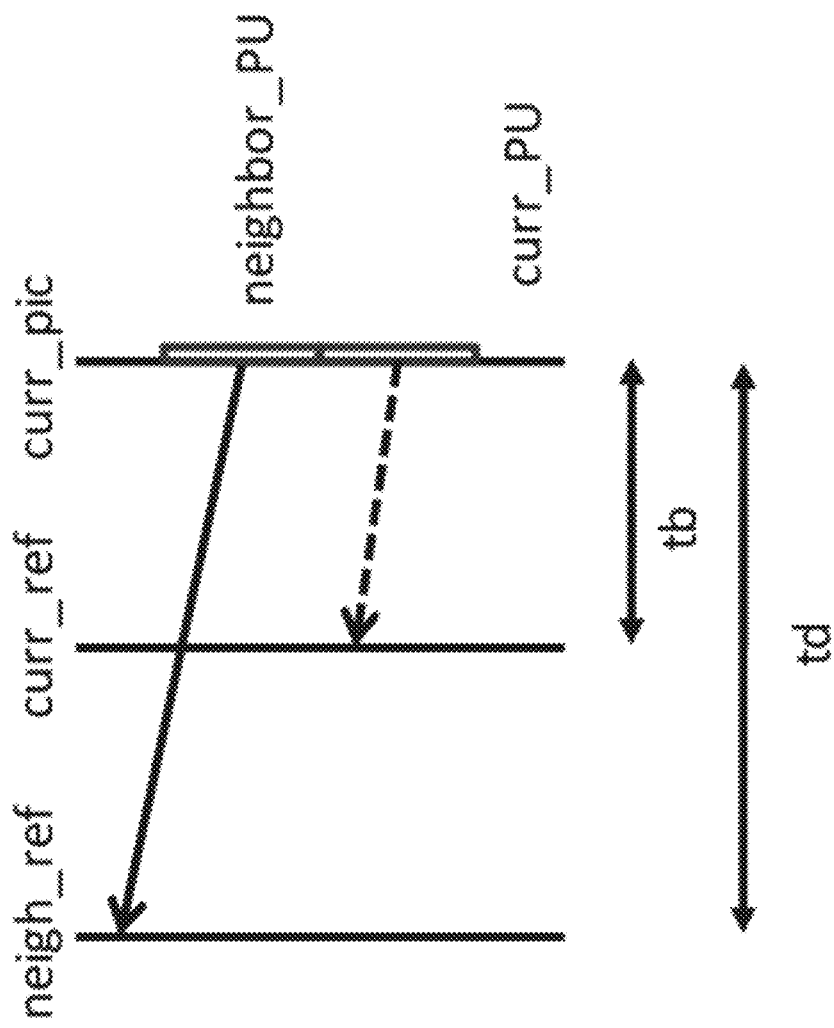
FIG. 10 shows an example of motion vector scaling for spatial motion vector candidates.

In a spatial scaling process, the motion vector of the neighboring PU is scaled in a similar manner as for temporal scaling, as depicted as FIG. 10. The main difference is that the reference picture list and index of current PU is given as input; the actual scaling process is the same as that of temporal scaling.

2.2.2.3. Temporal Motion Vector Candidates

Apart from the reference picture index derivation, all processes for the derivation of temporal merge candidates are the same as for the derivation of spatial motion vector candidates (see FIG. 7). The reference picture index is signalled to the decoder.

2.3. Adaptive Motion Vector Difference Resolution (AMVR)

In VVC, for regular inter mode, motion vector differences (MVD) can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.4. Interpolation Filters in VVC

For the luma interpolation filtering, 8-tap separable interpolation filters are used for $1/16$-pel precision samples, as shown in Table 1.

TABLE 1

8-tap coefficients $f_L$ for 1/16-pel luma interpolation.

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 1  | 0  | 1 | -3  | 63 | 4  | -2  | 1 | 0  |
| 2  | -1 | 2 | -5  | 62 | 8  | -3  | 1 | 0  |
| 3  | -1 | 3 | -8  | 60 | 13 | -4  | 1 | 0  |
| 4  | -1 | 4 | -10 | 58 | 17 | -5  | 1 | 0  |
| 5  | -1 | 4 | -11 | 52 | 26 | -8  | 3 | -1 |
| 6  | -1 | 3 | -9  | 47 | 31 | -10 | 4 | -1 |
| 7  | -1 | 4 | -11 | 45 | 34 | -10 | 4 | -1 |
| 8  | -1 | 4 | -11 | 40 | 40 | -11 | 4 | -1 |
| 9  | -1 | 4 | -10 | 34 | 45 | -11 | 4 | -1 |
| 10 | -1 | 4 | -10 | 31 | 47 | -9  | 3 | -1 |
| 11 | -1 | 3 | -8  | 26 | 52 | -11 | 4 | -1 |
| 12 | 0  | 1 | -5  | 17 | 58 | -10 | 4 | -1 |
| 13 | 0  | 1 | -4  | 13 | 60 | -8  | 3 | -1 |
| 14 | 0  | 1 | -3  | 8  | 62 | -5  | 2 | -1 |
| 15 | 0  | 1 | -2  | 4  | 63 | -3  | 1 | 0  |

Similarly, 4-tap separable interpolation filters are used for the $1/32$-pel precisions chroma interpolation, as shown in Table 2.

TABLE 2

4-tap interpolation coefficients $f_C$ for 1/32-pel chroma interpolation.

| Fractional sample position p | $f_C[p][0]$ | $f_C[p][1]$ | $f_C[p][2]$ | $f_C[p][3]$ |
|---|---|---|---|---|
| 1 | -1 | 63 | 2 | 0  |
| 2 | -2 | 62 | 4 | 0  |
| 3 | -2 | 60 | 7 | -1 |

TABLE 2-continued 4-tap interpolation coefficients $f_C$ for 1/32-pel chroma interpolation.

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 4  | −2 | 58 | 10 | −2 |
| 5  | −3 | 57 | 12 | −2 |
| 6  | −4 | 56 | 14 | −2 |
| 7  | −4 | 55 | 15 | −2 |
| 8  | −4 | 54 | 16 | −2 |
| 9  | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7  | 60 | −2 |
| 30 | 0  | 4  | 62 | −2 |
| 31 | 0  | 2  | 63 | −1 |

For the vertical interpolation for 4:2:2 and the horizontal and vertical interpolation for 4:4:4 chroma channels, the odd positions in Table 2 are not used, resulting in 1/16-pel chroma interpolation.

2.5. Alternative Luma Half-Pel Interpolation Filters

In JVET-N0309, alternative half-pel interpolation filters are proposed.

The switching of the half-pel luma interpolation filter is done depending on the motion vector accuracy. In addition to the existing quarter-pel, full-pel, and 4-pel AMVR modes, a new half-pel accuracy AMVR mode is introduced. Only in case of half-pel motion vector accuracy, an alternative half-pel luma interpolation filter can be selected.

2.5.1. Half-Pel AMVR Mode

An additional AMVR mode for non-affine non-merge inter-coded CUs is proposed which allows signalling of motion vector differences at half-pel accuracy. The existing AMVR scheme of the current VVC draft is extended straightforward in the following way: Directly following the syntax element amvr_flag, if amvr_flag==1, there is a new context-modeled binary syntax element hpel_amvr_flag which indicates usage of the new half-pel AMVR mode if hpel_amvr_flag==1. Otherwise, i.e., if hpel_amvr_flag==0, the selection between full-pel and 4-pel AMVR mode is indicated by the syntax element amvr_precision_flag as in the current VVC draft.

2.5.2. Alternative Luma Half-Pel Interpolation Filters

For a non-affine non-merge inter-coded CU which uses half-pel motion vector accuracy (i.e., the half-pel AMVR mode), a switching between the HEVC/VVC half-pel luma interpolation filter and one or more alternative half-pel interpolation is made based on the value of a new syntax element if_idx. The syntax element if_idx is only signalled in case of half-pel AMVR mode. In case of skip/merge mode using a spatial merging candidate, the value of the syntax element if_idx is inherited from the neighboring block.

2.5.2.1. Test 1: One Alternative Half-Pel Interpolation Filter

In this test case, there is one 6-tap interpolation filter as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0 | Gauss (6-tap) | [0, 3, 9, 20, 20, 9, 3, 0] |
| 1 | 1 | HEVC/VVC (8-tap) | [−1, 4, −11, 40, 40, −11, 4, −1] |

2.5.2.2. Test 2: Two Alternative Half-Pel Interpolation Filters

In this test case, there are two 8-tap interpolation filters as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0  | Filter 1 (8-tap) | [3, 6, 10, 13, 13, 10, 6, 3] |
| 1 | 10 | Filter 2 (8-tap) | [−1, −1, 9, 25, 25, 9, −1, −1] |
| 2 | 11 | HEVC/VVC (8-tap) | [−1, 4, −11, 40, 40, −11, 4, −1] | amvr_precision_idx is signalled to indicate whether the current CU employs ½-pel, 1-pel or 4-pel MV precision. There are 2 bins to be coded.

hpel_if_idx is signalled to indicate whether the default half-pel interpolation filter or alternative half-pel interpolation filters are used. When 2 alternative half-pel interpolation filters are used, there are 2 bins to be coded.

2.6. Generalized Bi-Prediction

In conventional bi-prediction, the predictors from L0 and L1 are averaged to generate the final predictor using the equal weight 0.5. The predictor generation formula is shown as in Equ. (1)

$$P_{TraditionalBiPred} = (P_{L0} + P_{L1} + \text{RoundingOffset}) \gg \text{shiftNum}, \quad (1)$$

In Equ. (1), $P_{TraditionalBiPred}$ is the final predictor for the conventional bi-prediction, $P_{L0}$ and PU are predictors from L0 and L1, respectively, and RoundingOffset and shiftNum are used to normalize the final predictor.

Generalized bi-prediction (GBi) is proposed to allow applying different weights to predictors from L0 and L1. The predictor generation is shown in Equ. (2).

$$P_{GBi} = ((1 - w_1) * P_{L0} + w_1 * P_{L1} + \text{RoundingOffset}_{GBi}) \gg \text{shiftNum}_{GBi}, \quad (2)$$

In Equ. (2), $P_{GBi}$ is the final predictor of GBi. $(1 - w_1)$ and $w_1$ are the selected GBi weights applied to the predictors of L0 and L1, respectively. $\text{RoundingOffset}_{GBi}$ and $\text{shiftNum}_{GBi}$ are used to normalize the final predictor in GBi.

The supported weights of $w_1$ is $\{-¼, ⅜, ½, ⅝, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBi is explicitly signalled at CU-level if this CU is coded by bi-prediction. For merge mode, the weight selection is inherited from the merge candidate.

2.7. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVD information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

FIG. 13 shows an example of a MMVD search. Distance index specifies motion magnitude information and indicates the pre-defined offset from the starting point. As shown in FIG. 13, an offset is added to either horizontal component or vertical component of a starting MV. The relation of distance index and pre-defined offset is specified in Table 3.

TABLE 3

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

Direction index represents the direction of the MVD relative to the starting point. The direction index can represent of the four directions as shown in Table 4. It is noted that the meaning of MVD sign could vary according to the information of starting MV(s). When the starting MV(s) is an uni-prediction MV or bi-prediction MVs with both lists pointing to the same side of the current picture (i.e., POCs of two references are both larger than the POC of the current picture, or are both smaller than the POC of the current picture), the sign in Table 4 specifies the sign of MV offset added to the starting MV. When the starting MVs are bi-prediction MVs with the two MVs pointing to different sides of the current picture (i.e., the POC of one reference is larger than the POC of the current picture, and the POC of the other reference is smaller than the POC of the current picture), the sign in Table 4 specifies the sign of MV offset added to the list0 MV component of starting MV and the sign for the list1 MV has an opposite value.

TABLE 4

Sign of MV offset specified by direction index

| Direction IDX | 00 | 01 | 10 | 11 |
|---|---|---|---|---|
| x-axis | + | − | N/A | N/A |
| y-axis | N/A | N/A | + | − | slice_fpel_mmvd_enabled_flag may be signalled in slice header to indicate whether fractional distance can be used in MMVD. When fractional distances are not allowed for the slice, the above distances will be multiplied by 4 to generate the following distance table.

TABLE 5

The relation of distance index and pre-defined offset when slice_fpel_mmvd_enabled_flag is equal to 1.

| Distance IDX | 0 | 1 | 2 | 3 | 4 | 5 | 6 | 7 |
|---|---|---|---|---|---|---|---|---|
| Offset (in unit of luma sample) | 1 | 2 | 4 | 8 | 16 | 32 | 64 | 128 | slice_fpel_mmvd_enabled_flag equal to 1 specifies that merge mode with motion vector difference uses integer sample precision in the current slice. slice_fpel_mmvd_enabled_flag equal to 0 specifies that merge mode with motion vector difference can use fractional sample precision in the current slice. When not present, the value of slice_fpel_mmvd_enabled_flag is inferred to be 0.

3. Problems in Conventional Implementations

Alternative half-pel interpolation filters may be inherited in merge with motion vector difference (MMVD) mode even though the MV derived in MMVD mode are not of ½-pel precision, which is not reasonable.

When coding amvr_precision_idx and hpel_if_idx, all the bins are context coded.

The alternative interpolation filter flag could be inherited from spatial neighboring blocks if the associated merge candidate derived from the spatial neighboring block is selected. However, when the inherited MV is further refined (e.g., using DMVR), the final MV may be not pointing to the half-pel precision. Therefore, even when the flag is true, the alternative interpolation filter is also disabled since the usage of the new filter is under the conditions that the flag is true and MV is half-pel.

Similarly, in the AMVR process, if the AMVR precision is half-pel, MVP and MVD are both in half-pel. However, the final MV may be not in the half-pel. In this case, even though the signalled AMVR precision is representing half-pel, the new filter is disallowed to be used.

4. Example Embodiments

The embodiments detailed below should be considered as examples to explain general concepts. These embodiments should not be interpreted in a narrow way. Furthermore, these embodiments can be combined in any manner.

Decoder-side motion vector derivation (DMVD) is used to represent bi-direction optical flow (BDOF) or/and decoder-side motion vector refinement (DMVR) or/and other tools associated with refinement motion vector or prediction sample at decoder.

In the following text, the default interpolation filter may indicate the one defined in HEVC/VVC. Newly introduced interpolation filters (such as those proposed in JVET-N0309) may be also referred as alternative interpolation filters in the following description. The MMVD terminology may refer to any coding methods that may update the decoded motion information with some additional MVDs.

1. Alternative 1/N-pel interpolation filters may be used for different N with N unequal to 2.
   a. In one example, N may be equal to 4, 16, etc.
   b. In one example, the index of 1/N-pel interpolation filters may be signalled in AMVR mode.
      i. Alternatively, furthermore, the index of 1/N-pel interpolation filters may be signalled only when 1/N-pel MV/MVD precision is selected by the block.

c. In one example, alternative 1/N-pel interpolation filters may be not inherited in merge mode or/and MMVD mode.
   i. Alternatively, furthermore, only default 1/N-pel interpolation filter may be used in merge mode or/and MMVD mode.
d. In one example, alternative 1/N-pel interpolation filters may be inherited in merge mode.
e. In one example, alternative 1/N-pel interpolation filters may be inherited in MMVD mode.
   i. In one example, alternative 1/N-pel interpolation filters may be inherited in MMVD mode when the final derived MVs are of 1/N-pel precision, i.e., no MV component is of finer MV precisions.
   ii. In one example, alternative 1/N-pel interpolation filters may be inherited in MMVD mode when K (K>=1) MV components of the final derived MVs are of 1/N-pel precision.
f. In one example, alternative 1/N-pel interpolation filters may be inherited in MMVD mode or/and merge mode, however, alternative 1/N-pel interpolation filters are only used in motion compensation. The index of alternative 1/N-pel interpolation filters may not be stored for the block and may be not used by following coded blocks.

2. Indications of interpolation filters (such as default half-pel interpolation filter, alternative half-pel interpolation filters) may be stored together with other motion information, such as motion vectors, reference indices.
   a. In one example, for one block to be encoded/decoded, when it accesses a $2^{nd}$ block which is located in a different region (such as in different CTU rows, in different VPDU), the interpolation filters associated with the $2^{nd}$ block is disallowed to be utilized for encoding/decoding the current block.

3. Alternative half-pel interpolation filters may be not inherited in merge mode or/and MMVD mode.
   a. In one example, alternative half-pel interpolation filters may be not inherited in MMVD mode.
      i. Alternatively, furthermore, default half-pel interpolation filter in VVC may be always used for MMVD mode.
      ii. Alternatively, the alternative half-pel interpolation filters may be inherited in MMVD mode. That is, for MMVD mode, the alternative half-pel interpolation filter associated with the base merge candidate may be inherited.
   b. In one example, alternative half-pel interpolation filters may be inherited in MMVD mode under certain conditions.
      i. In one example, alternative half-pel interpolation filters may be inherited when the final derived MVs are of ½-pel precision, i.e., no MV component is of finer MV precision like ¼-pel precision, 1/16-pel precision.
      ii. In one example, alternative half-pel interpolation filters may be inherited in MMVD mode when K (K>=1) MV components of the final derived MVs are of ½-pel precision.
      iii. In one example, alternative half-pel interpolation filters may be inherited when the selected distance (e.g., distance defined in Table 3) in MMVD is with X-pel precision or coarser precision than X-pel (e.g., X is ½, and 1-pel, 2-pel, 4-pel etc. are coarser than X-pel).
      iv. In one example, alternative half-pel interpolation filters may not be inherited when the selected distance (e.g., distance defined in Table 3) in MMVD is with X-pel precision or finer precision than X-pel (e.g., X is ¼, and 1/16-pel than X-pel).
      v. When alternative half-pel interpolation filter is not used in MMVD, the information of alternative half-pel interpolation filters may not be stored for the block and may not be used by following coded blocks.
   c. In one example, alternative half-pel interpolation filters may be inherited in MMVD mode or/and merge mode, however, alternative half-pel interpolation filters are only used in motion compensation. The index of default half-pel interpolation filters, instead of alternative half-pel interpolation filters, may be stored for the block and may be used by following coded blocks.
   d. The above methods may be applicable to the other cases wherein multiple interpolation filters for the 1/N-pel precision may be applied.

4. MV/MVD precision information may be stored for CU/PU/block coded in AMVP mode or/and affine inter mode and may be inherited by CU/PU/block coded in merge mode or/and affine merge mode.
   a. In one example, for a candidate derived from a spatial neighboring (adjacent or non-adjacent) block, the MV/MVD precision of the associated neighboring block may be inherited.
   b. In one example, for pair-wise merge candidate, if the two associated spatial merge candidates are with the same MV/MVD precision, such MV/MVD precision may be allocated to the pair-wise merge candidate; otherwise, a fixed MV/MVD precision (e.g., ¼-pel or 1/16-pel) may be allocated.
   c. In one example, a fixed MV/MVD precision (e.g., ¼-pel or 1/16-pel) may be allocated to the temporal merge candidate.
   d. In one example, the MV/MVD precision may be stored in the history-based motion vector prediction (HMVP) table and may be inherited by the HMVP merge candidate.
   e. In one example, MV/MVD precision of the base merge candidate may be inherited by CU/PU/block coded in MMVD mode.
   f. In one example, the inherited MV/MVD precision may be used to predict the MV/MVD precision of following blocks.
   g. In one example, the MV of merge-coded block may be rounded to the inherited MV/MVD precision.

5. Which distance table to be used in MMVD may be dependent on the MV/MVD precision of the base merge candidate.
   a. In one example, if MV/MVD of the base merge candidate is of 1/N-pel precision, then the distances used in MMVD shall be with 1/N-pel precision or coarser precision than 1/N-pel.
      i. For example, if N=2, then the distances in MMVD may be only of ½-pel, 1-pel, 2-pel, etc. precision.
   b. In one example, the distances table (defined in Table 3) that includes fractional distance (e.g., the distance table defined when slice_fpel_mmvd_enabled_flag is equal to 0) may be modified according to the MV/MVD precision of the base merge candidate.
      i. For example, if the MV/MVD precision of the base merge candidate is 1/N-pel and the finest MVD precision of the distance table is 1/M-pel (e.g., M=4), then all distances in the distance table may be multiplied by M/N.

6. For a CU/PU/block (e.g., coded in merge mode) selecting alternative half-pel interpolation filter, when the MVD derived in DMVR is with finer precision than X-pel (e.g., X=½), the information of alternative half-pel interpolation filter may not be stored for the CU/PU/block and may not be used by the following blocks.
   a. In one example, whether the information of alternative half-pel interpolation filter is stored or not may be decided independently for different sub-blocks if DMVR is performed at sub-block level, according to the MVD precision of the sub-block derived in DMVR.
   b. In one example, if the derived MVD is with finer precision than X-pel for at least N (e.g., N=1) of the sub-blocks/blocks, information of alternative half-pel interpolation filter may not be stored and may not be used for following blocks.
7. Interpolation filter information may be stored in history-based motion vector prediction (HMVP) table and may be inherited by HMVP merge candidate.
   a. In one example, when inserting a new candidate into the HMVP lookup table, the interpolation filter information may be considered. For example, two candidates with same motion information but different interpolation filter information may be considered as two different candidates.
   b. In one example, when inserting a new candidate into the HMVP lookup table, two candidates with same motion information but different interpolation filter information may be considered as same candidates.
8. When inserting merge candidates into the merge candidate list, interpolation filter information may be considered in the pruning process.
   a. In one example, two merge candidates with different interpolation filters may be considered as two different merge candidates.
   b. In one example, when inserting the HMVP merge candidates into the merge list, interpolation filter information may be considered in the pruning process.
   c. In one example, when inserting the HMVP merge candidates into the merge list, interpolation filter information may be not considered in the pruning process.
9. When generating pair-wise merge candidates or/and combined merge candidates or/and zero motion vector candidates or/and other default candidates, interpolation filter information may be taken into consideration instead of always using the default interpolation filter.
   a. In one example, if both candidates (involved in generating pair-wise merge candidates or/and combined merge candidates) employ same alternative interpolation filter, such interpolation filter may be inherited in the pair-wise merge candidates or/and combined merge candidates.
   b. In one example, if one of two candidates (involved in generating pair-wise merge candidates or/and combined merge candidates) does not employ default interpolation filter, its interpolation filter may be inherited in the pair-wise merge candidates or/and combined merge candidates.
   c. In one example, if one of the two candidates (involved in generating combined merge candidates) does not employ default interpolation filter, its interpolation filter may be inherited in the combined merge candidates. However, such interpolation filter may be only used for the corresponding prediction direction.
   d. In one example, if the two candidates (involved in generating combined merge candidates) employ different interpolation filters, their interpolation filters may be both inherited in the combined merge candidates. In this case, different interpolation filter may be used for different prediction directions.
   e. In one example, no more than K (K>=0) pair-wise merge candidates or/and combined merge candidates may use alternative interpolation filters.
   f. In one example, default interpolation filters are always used for pair-wise merge candidates or/and combined merge candidates.
10. It is proposed to disable the usage of half-pel motion vector/motion vector difference precision when the current block is coded with IBC mode.
    a. Alternatively, furthermore, there is no need to signal the indication of usage of half-pel MV/MVD precision.
    b. In one example, alternative half-pel interpolation filter is always disabled if the current block is coded with IBC mode.
    c. Alternatively, furthermore, there is no need to signal the indication of half-pel interpolation filter.
    d. In one example, the condition of 'the current block is coded with IBC mode' may be replaced by 'the current block is coded with a mode'. Such a mode may be defined as triangular mode, merge mode, etc.
11. When encoding amvr_precision_idx and/or hpel_if_idx, only the first bin may be context-coded.
    a. Alternatively, furthermore, other bins may be bypass-coded.
    b. In one example, the first bin of amvr_precision_idx may be bypass-coded.
    c. In one example, the first bin of hpel_if_idx may be bypass-coded.
    d. In one example, only 1 context may be used to code the first bin of amvr_precision_idx.
    e. In one example, only 1 context may be used to code the first bin of hpel_if_idx.
    f. In one example, all bins of amvr_precision_idx may share one same context.
    g. In one example, all bins of hpel_if_idx may share one same context.
12. Some coding tools may be disallowed when alternative interpolation filters are employed.
    a. In one example, bi-directional optical flow (BDOF) may be disallowed when alternative interpolation filters are employed.
    b. In one example, DMVR or/and DMVD may be disallowed when alternative interpolation filters are employed.
    c. In one example, combined inter-intra prediction (CIIP) may be disallowed when alternative interpolation filters are employed.
        i. In one example, CIIP flag may be skipped and inferred to be false when a merge candidate inherits alternative interpolation filters.
        ii. Alternatively, when CIIP flag is true, default interpolation filter may be always employed.
    d. In one example, symmetric motion vector difference (SMVD) may be disallowed when alternative interpolation filters are employed.

i. In one example, when SMVD is employed, default interpolation filters are always used, and syntax elements related to alternatively interpolation filters are not signalled.

ii. Alternatively, when syntax elements related to alternatively interpolation filters indicate that alternative interpolation filters are employed, SMVD related syntax elements may be not signalled and SMVD mode is not used.

e. In one example, subblock transform (SBT) may be disallowed when alternative interpolation filters are employed.

i. In one example, when SBT is employed, default interpolation filters are always used, and syntax elements related to alternatively interpolation filters are not signalled.

ii. Alternatively, when syntax elements related to alternatively interpolation filters indicate that alternative interpolation filters are employed, SBT related syntax elements may be not signalled and SBT is not used.

f. In one example, triangle prediction may be disallowed when alternative interpolation filters are employed.

i. In one example, interpolation filter information may be not inherited in triangle prediction and only default interpolation filters may be used.

g. Alternatively, triangle prediction may be allowed when alternative interpolation filters are employed.

i. In one example, interpolation filter information may be inherited in triangle prediction.

h. Alternatively, for a coding tool which is mentioned above, if it is enabled, then the alternative half-pel interpolation filter may be disabled.

13. A filter may be applied to N-pel precision MVs.

a. In one example, N may be equal to 1, 2 or 4 etc.

b. In one example, the filter may be a low-pass filter.

c. In one example, the filter may be a one-dimensional (1-d) filter.

i. For example, the filter may be a 1-d horizontal filter.

ii. For example, the filter may be a 1-d vertical filter.

d. In one example, a flag may be signalled to indicate whether such filter is employed or not.

i. Alternatively, furthermore, such flag may be signalled only when the N-pel MVD precision (signalled in AMVR mode) is used for the block.

14. Different weighing factor sets may be used for regular inter mode and affine mode in GBi mode.

a. In one example, weighting factor sets used for regular inter mode and affine mode may be signalled in sequence parameter set (SPS)/tile group header/slice header/video parameter set (VPS)/picture parameter set (PPS), etc.

b. In one example, weighting factor sets used for regular inter mode and affine mode may be pre-defined at encoder and decoder.

15. How to define/select alternative interpolation filters may depend on the coded mode information.

a. In one example, for the affine mode, and non-affine mode, the allowed sets of alternative interpolation filters may be different.

b. In one example, for the IBC mode, and non-IBC mode, the allowed sets of alternative interpolation filters may be different.

16. In one example, whether the alternative half-pel interpolation filter is applied in a merge or skip coded block is independent of whether the alternative half-pel interpolation filter is applied in a neighboring block.

a. In one example, hpel_if_idx is not stored for any block.

b. In one example, whether to inherit or discard the alternative half-pel interpolation filter may depend on coded information and/or depend on the enabling/disabling of other coding tools.

17. In one example, whether the alternative half-pel interpolation filter is applied (e.g., in a merge or skip coded block) may depend on the coding information of the current block.

a. In one example, if merge index is equal to K, the alternative half-pel interpolation filter is applied in a merge or skip coded block, K is an integer such as 2, 3, 4, 5.

b. In one example, if merge index Idx satisfies Idx % S is equal to K, the alternative half-pel interpolation filter is applied in a merge or skip coded block, where S and K are integers. For example, S is equal to 2 and K is equal 1.

c. In one example, a specific merge candidate may apply the alternative half-pel interpolation filter. For example, pair-wise merge candidate may apply the alternative half-pel interpolation filter.

18. In one example, the alternative half-pel interpolation filter may be aligned with the half-pel interpolation filter used in affine inter-prediction.

a. For example, the unified interpolation filter coefficients may be [3, −11, 40, 40, −11, 3].

b. For example, the unified interpolation filter coefficients may be [3, 9, 20, 20, 9, 3].

19. In one example, the alternative half-pel interpolation filter may be identical to the half-pel interpolation filter used in chroma inter-prediction.

a. For example, the unified interpolation filter coefficients may be [−4, 36, 36, −4].

20. In one example, an alternative interpolation filter may be applied not only on half-pel positions.

a. For example, if alternative interpolation filter is indicated explicitly or implicitly to be applied (e.g., hpel_if_idx is equal to 1), and the MV refers to a position at X-pel, wherein X is not equal to ½ (e.g., ¼ or ¾), then an alternative interpolation filter for X-pel position should be applied. The alternative interpolation filter should have at least one coefficient different to the original interpolation filter for X-pel position.

b. In one example, the above bullet is applied after the Decoder-side Motion Vector Refinement (DMVR) or MMVD or SMVD or other decoder side motion derivation process.

c. In one example, the above bullet is applied if the reference picture has a different resolution to the current picture if reference picture resampling (RPR) is used.

21. Alternative interpolation filter may be applied only to one prediction direction in bi-prediction case.

22. When the alternative interpolation filter for MV components with X-pel (e.g., X=½) precision is selected by a block, suppose there are MV components with precisions other than X-pel (e.g., ¼, 1/16), other alternative interpolation filters instead of default interpolation filters may be used for such MV components.

a. In one example, if the Gaussian interpolation filter is selected for MV components with X-pel precision, Gaussian interpolation filters may also be used for MV components with precisions other than X-pel.
  b. In one example, if the Flattop interpolation filter is selected for MV components with X-pel precision, Flattop interpolation filters may also be used for MV components with precisions other than X-pel.
  c. In one example, such constraints may be applied only to certain MV precisions other than X-pel precision.
     i. For example, such constraints may be applied only to MV components with finer precision than X-pel.
     ii. For example, such constraints may be applied only to MV components with coarser precision than X-pel.
23. Whether to and/or how to apply alternative interpolation filter may depend on whether RPR is used.
  a. In one example, alternative interpolation filter should not be used if RPR is used.
  b. In one example, alternative interpolation filter (e.g., the ½-pel interpolation filter) should not be used if current block's reference picture is in a different resolution compared to current picture.

5. Embodiment Examples

An example is shown for bullet 3 on top of JVET-O2001-vE. The newly added parts are highlighted in bold, underlined text.

8.5.2.2. Derivation Process for Luma Motion Vectors for Merge Mode

This process is only invoked when general_merge_flag [xCb][yCb] is equal to 1, where (xCb, yCb) specify the top-left sample of the current luma coding block relative to the top-left luma sample of the current picture.

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvL0[0][0] and mvL1[0][0],
  the reference indices refIdxL0 and refIdxL1,
  the prediction list utilization flags predFlagL0[0][0] and predFlagL1[0][0],
  the half sample interpolation filter index hpelIfIdx,
  the bi-prediction weight index bcwIdx.
  the merging candidate list mergeCandList.

The bi-prediction weight index bcwIdx is set equal to 0.

The motion vectors mvL0[0][0] and mvL1[0][0], the reference indices refIdxL0 and refIdxL1 and the prediction utilization flags predFlagL0[0][0] and predFlagL1[0][0] are derived by the following ordered steps:

1. The derivation process for spatial merging candidates from neighboring coding units as specified in clause 8.5.2.3 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, the half sample interpolation filter indices hpelIfIdx$A_0$, hpelIfIdx$A_1$, hpelIfIdx$B_0$, hpelIfIdx$B_1$, hpelIfIdx$B_2$, and the bi-prediction weight indices bcwIdx$A_0$, bcwIdx$A_1$, bcwIdx$B_0$, bcwIdx$B_1$, bcwIdx$B_2$.

2. The reference indices, refIdxLXCol, with X being 0 or 1, and the bi-prediction weight index bcwIdxCol for the temporal merging candidate Col are set equal to 0 and hpelIfIdxCol is set equal to 0.

3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

$$\text{availableFlagCol} = \text{availableFlag}L0\text{Col} \qquad (8\text{-}303)$$

$$\text{predFlag}L0\text{Col} = \text{availableFlag}L0\text{Col} \qquad (8\text{-}304)$$

$$\text{predFlag}L1\text{Col} = 0 \qquad (8\text{-}305)$$

4. When slice type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

$$\text{availableFlagCol} = \text{availableFlag}L0\text{Col} \| \text{availableFlag}L1\text{Col} \qquad (8\text{-}306)$$

$$\text{predFlag}L1\text{Col} = \text{availableFlag}L1\text{Col} \qquad (8\text{-}307)$$

5. The merging candidate list, mergeCandList, is constructed as follows:

$i=0$ if(availableFlag$A_1$)

mergeCandList[$i$++]=$A_1$ if(availableFlag$B_1$)

mergeCandList[$i$++]=$B_1$ if(availableFlag$B_0$)

mergeCandList[$i$++]=$B_0$ if(availableFlag$A_0$)

mergeCandList[$i$++]=$A_0$ if(availableFlag$B_2$)

mergeCandList[$i$++]=$B_2$ if(availableFlagCol)

$$\text{mergeCandList}[i\text{++}] = \text{Col} \qquad (8\text{-}308)$$

6. The variable numCurrMergeCand and numOrigMerge-Cand are set equal to the number of merging candidates in the mergeCandList.
7. When numCurrMergeCand is less than (MaxNumMergeCand−1) and NumHmvpCand is greater than 0, the following applies:
   The derivation process of history-based merging candidates as specified in 8.5.2.6 is invoked with mergeCandList and numCurrMergeCand as inputs, and modified mergeCandList and numCurrMergeCand as outputs.
   numOrigMergeCand is set equal to numCurrMergeCand.
8. When numCurrMergeCand is less than MaxNumMergeCand and greater than 1, the following applies:
   The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N, and the half sample interpolation filter index hpelIfIdxN of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.
   numOrigMergeCand is set equal to numCurrMergeCand.
9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The half sample interpolation filter index hpelIfIdx of every new candidate zeroCand$_m$ being added into mergeCandList is set equal to 0. The bi-prediction weight index bcwIdx of every new candidate zeroCand$_m$ being added into mergeCandList is set equal to 0. The number of candidates being added, numZeroMergeCand, is set equal to (numCurrMergeCand − numOrigMergeCand). When numZeroMergeCand is greater than 0, m ranges from 0 to numZeroMergeCand −1, inclusive.
10. The following assignments are made with N being the candidate at position merge_idx[xCb][yCb] in the merging candidate list mergeCandList (N=mergeCandList[merge_idx[xCb][yCb]]) and X being replaced by 0 or 1:

$$\text{refIdx}LX = \text{refIdx}LXN \quad (8\text{-}309)$$

$$\text{predFlag}LX[0][0] = \text{predFlag}LXN \quad (8\text{-}310)$$

$$\text{mv}LX[0][0][0] = \text{mv}LXN[0] \quad (8\text{-}311)$$

$$\text{mv}LX[0][0][1] = \text{mv}LXN[1] \quad (8\text{-}312)$$

$$\text{hpelIfIdx} = \text{hpelIfIdx}N \quad (8\text{-}313)$$

$$bcw\text{Idx} = bcw\text{Idx}N \quad (8\text{-}314)$$

11. When mmvd_merge_flag[xCb][yCb] is equal to 1, the following applies:
   The derivation process for merge motion vector difference as specified in 8.5.2.7 is invoked with the luma location (xCb, yCb), the reference indices refIdxL0, refIdxL1 and the prediction list utilization flags predFlagL0[0][0] and predFlagL1[0][0] as inputs, and the motion vector differences mMvdL0 and mMvdL1 as outputs.
   The motion vector difference mMvdLX is added to the merge motion vectors mvLX for X being 0 and 1 as follows:

$$\text{mv}LX[0][0][0] += m\text{Mvd}LX[0] \quad (8\text{-}315)$$

$$\text{mv}LX[0][0][1] += m\text{Mvd}LX[1] \quad (8\text{-}316)$$

$$\text{mv}LX[0][0][0] = \text{Clip3}(-2^{17}, 2^{17}-1, \text{mv}LX[0][0][0]) \quad (8\text{-}317)$$

$$\text{mv}LX[0][0][1] = \text{Clip3}(-2^{17}, 2^{17}-1, \text{mv}LX[0][0][1]) \quad (8\text{-}318)$$

hpelIfIdx is set equal to zero if any of the following condition is true:
1. mMvdL0[0]% 8 is not equal to zero.
2. mMvdL1[0]% 8 is not equal to zero.
3. mMvdL0[1]% 8 is not equal to zero.
4. mMvdL1[1]% 8 is not equal to zero.

6. Example Implementations of the Disclosed Embodiments

Figure 11A:
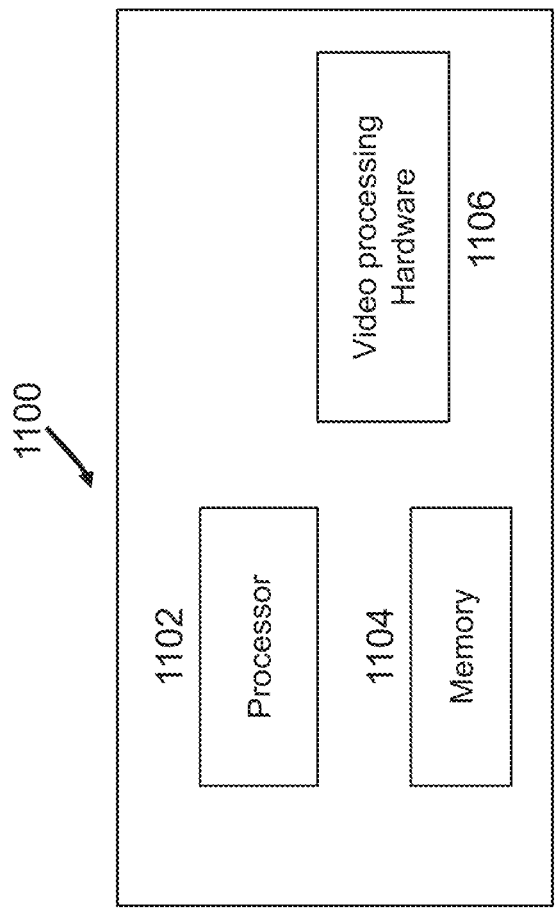
FIGS. 11A and 11B are block diagrams of examples of a hardware platform for implementing a visual media decoding or a visual media encoding embodiment described in the present document.

FIG. 11A is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and embodiments described herein. The video processing hardware 1106 may be used to implement, in hardware circuitry, some embodiments described in the present document, and may be partly or completely be a part of the processors 1102 (e.g., graphics processor core (GPU) or other signal processing circuitry).

Figure 11B:
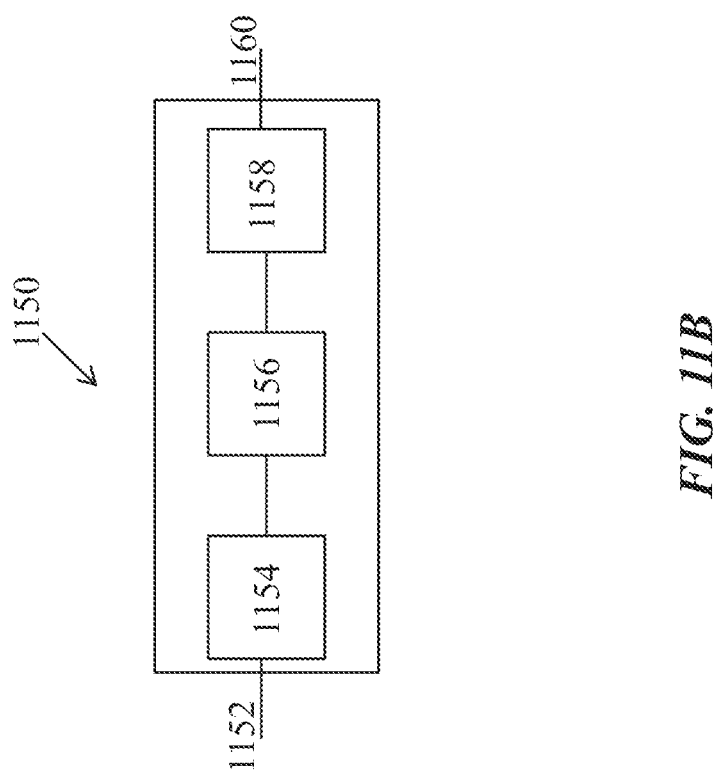

FIG. 11B is another example of a block diagram of a video processing system in which disclosed embodiments may be implemented. FIG. 11B is a block diagram showing an example video processing system 1150 in which various embodiments disclosed herein may be implemented. Various implementations may include some or all of the components of the system 1150. The system 1150 may include input 1152 for receiving video content. The video content may be received in a raw or uncompressed format, e.g., 8- or 10-bit multi-component pixel values, or may be in a compressed or encoded format. The input 1152 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1150 may include a coding component 1154 that may implement the various coding or encoding methods described in the present document. The coding component 1154 may reduce the average bitrate of video from the input 1152 to the output of the coding component 1154 to produce a coded representation of the video. The coding techniques are therefore sometimes called video compression or video transcoding techniques. The output of the coding component 1154 may be either stored, or transmitted via a communication connected, as represented by the component 1156. The stored or communicated bitstream (or coded) representation of the video received at the input 1152 may be used by the component 1158 for generating pixel values or displayable video that is sent to a display interface 1160. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present document may be embodied in various electronic devices such as mobile phones, laptops, smartphones or other devices that are capable of performing digital data processing and/or video display.

In some embodiments, the video processing methods discussed in this patent document may be implemented using an apparatus that is implemented on a hardware platform as described with respect to FIG. 11A or 11B.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and embodiments will benefit video encoder and/or decoder embodiments incorporated within video processing devices such as smartphones, laptops, desktops, and similar devices by allowing the use of the embodiments disclosed in the present document.

FIG. 12 is a flowchart for an example method 1200 of video processing. The method 1200 includes, at 1210, determining, for a current video block, a single set of motion information based on applying at least one interpolation filter to a set of neighboring blocks, wherein the at least one interpolation filter is configurable to an integer pixel accuracy or a sub-pixel accuracy of the single set of motion information. The method 1200 also includes, at 1220, performing a conversion between the current video block and a bitstream representation of the current video block, wherein the conversion includes a decoder motion vector refinement (DMVR) step for refining the single set of motion information signalled in the bitstream representation.

The first set of clauses describe some embodiments discussed in the previous section.

1. A method of video processing, comprising: determining, for a current video block, a single set of motion information based on applying at least one interpolation filter to a set of neighboring blocks, wherein the at least one interpolation filter is configurable to an integer pixel accuracy or a sub-pixel accuracy of the single set of motion information; and performing a conversion between the current video block and a bitstream representation of the current video block, wherein the conversion includes a decoder motion vector refinement (DMVR) step for refining the single set of motion information signalled in the bitstream representation.

2. The method of clause 1, wherein when the single set of motion information is associated with an adaptive motion vector resolution (AMVR) mode, an index of the at least one interpolation filter is signalled in the bitstream representation.

3. The method of clause 1, wherein when the single set of motion information is associated with a merge mode, an index of the at least one interpolation filter is inherited from a previous video block.

4. The method of clause 1, wherein when the single set of motion information is associated with a merge with motion vector difference (MMVD) mode, an index of the at least one interpolation filter is inherited from a previous video block.

5. The method of clause 1, wherein the at least one interpolation filter corresponds to a default filter with the sub-pixel accuracy, and wherein the single set of motion information is associated with a merge with motion vector difference (MMVD) mode.

6. The method of any of clauses 2-4, wherein coefficients of the at least one interpolation filter for the current video block are inherited from the previous video block.

7. The method of any of clauses 1-6, wherein the sub-pixel accuracy of the single set of motion information equals ¼ pixel or 1/16 pixel.

8. The method of any of clauses 1-7, wherein one or more components of the single set of motion information have the sub-pixel accuracy.

9. The method of clause 1, wherein the at least one interpolation filter is expressed using 6 coefficients or 8 coefficients.

10. The method of clause 5, wherein an index of the at least one interpolation filter is associated exclusively for the current video block and not associated for subsequent video blocks.

11. The method of clause 1, wherein information related to the at least one interpolation filter is stored along with the single set of motion information.

12. The method of clause 11, wherein the information related to the at least one interpolation filter identifies the at least one interpolation filter as a default filter.

13. The method of clause 1, wherein coefficients of the at least one interpolation filter for the current video block are prevented from utilization by an interpolation filter of another video block.

14. The method of any of clause 1-13, wherein the at least one interpolation filter corresponds to a plurality of filters, each filter in the plurality of filters associated with the sub-pixel accuracy of the single set of motion information.

15. The method of any of clauses 1-14, wherein a precision of each component of the single set of motion information is equal to or lower than the sub-pixel accuracy the of the single set of motion information.

16. The method of any of clauses 1-15, wherein the at least one interpolation filter is stored in a history-based motion vector prediction (HMVP) lookup table.

17. The method of clause 16, further comprising: upon detecting that motion information of another video block is same as the single set of motion of the current video block, inserting the single set of motion information into the HMVP table without inserting the motion information of the another video block.

18. The method of clause 16, further comprising: upon detecting that motion information of another video block is same as the single set of motion of the current video block, inserting, into the HMVP table, the single set of motion information of the current video block and the motion information of the another video block.

19. The method of any of clauses 17-18, wherein the another video block is associated with an interpolation filter, and wherein the inserting is based, at least in part on the at least one interpolation filter of the current video block and/or the interpolation filter of the another video block.

20. The method of any of clauses 17-19, wherein the current video block and the another video block correspond to pair-wise candidates or combined merge candidates.

21. The method of any of clauses 17-20, wherein the at least one interpolation filter of the current video block and the interpolation filter of the another video block are same.

22. The method of any of clauses 17-20, wherein the at least one interpolation filter of the current video block and the interpolation filter of the another video block are different.

23. The method of clause 1, wherein the current video block is coded in an intra block copy (IBC) mode, and wherein a usage of the sub-pixel accuracy in representation of the single set of motion information is disabled.

24. The method of any of clauses 1-23, wherein a usage of the at least one interpolation filter is disabled.

25. The method of clause 1, wherein the at least one interpolation filter is associated with an amvr_precision_idx flag and/or a hpel_if_idx flag.

26. The method of clause 25, wherein the amvr_precision_idx flag and/or the hpel_if_idx flag are/is associated with bypass-coded bins or context-coded bins.

27. The method of clause 26, wherein a first bin is a bypass-coded bin or a context-coded bin.

28. The method of any of clauses 25-27, wherein all bins share a same context.

29. The method of clause 1, wherein one or more video processing steps are disabled based on employing the at least one interpolation filter.

30. The method of clause 29, wherein the one or more video processing steps include the decoder motion vector refinement (DMVR) step, a bi-directional optical flow (BDOF) step, a combined inter-intra prediction (CIIP) step, a symmetric motion vector difference (SMVD) step, a subblock transform (SBT) step, or a triangle prediction step.

31. The method of clause 30, wherein the at least one interpolation filter corresponds to a default filter.

32. The method of any of clauses 30-31, wherein disabling the one or more video processing steps include disabling, in the bitstream representation, an indication of the one or more video processing steps.

33. The method of any of clauses 30-31, wherein disabling the one or more video processing steps include disabling inheritance of the at least one interpolation filter of the current video block to another video block.

34. The method of clause 1, wherein the integer pixel accuracy of the single set of motion information corresponds to 1 pixel, 2 pixels, or 4 pixels.

35. The method of clause 34, wherein the at least one interpolation filter is a low-pass filter.

36. The method of clause 34, wherein the at least one interpolation filter is a one-dimensional filter.

37. The method of clause 36, wherein the one-dimensional filter is a horizontal filter or a vertical filter.

38. The method of clause 34, wherein a flag in the bitstream representation indicates whether the at least one interpolation filter is employed or not.

39. The method of any of clauses 1-38, wherein the current video block is associated with an adaptive motion vector resolution (AMVR) mode.

40. The method of any of clauses 1-39, wherein the at least one interpolation filter for an inter mode of the current video block is different from a generalized bi-prediction (GBi) mode of the current video block.

41. The method of any of clauses 1-40, wherein the at least one interpolation filter is pre-determined.

42. The method of any of clauses 1-41, wherein the bitstream representation includes a video parameter set (VPS), a picture parameter set (PPS), a picture header, a tile group header, or a slice header associated with the current video block.

43. The method of any one or more of clauses 1 through 42, wherein the video processing is an encoder-side implementation.

44. The method of any one or more of clauses 1 through 70, wherein the video processing is a decoder-side implementation.

45. An apparatus in a video system comprising a processor and a non-transitory memory with instructions thereon, wherein the instructions upon execution by the processor, cause the processor to implement the method in any of clauses 1 to 44.

46. A computer program product stored on a non-transitory computer readable media, the computer program product including program code for carrying out the method in any one or more of clauses 1 to 45.

The second set of clauses describe some embodiments discussed in the previous section, for example, Example Embodiments 3-6 and 16-23.

Figure 14A:
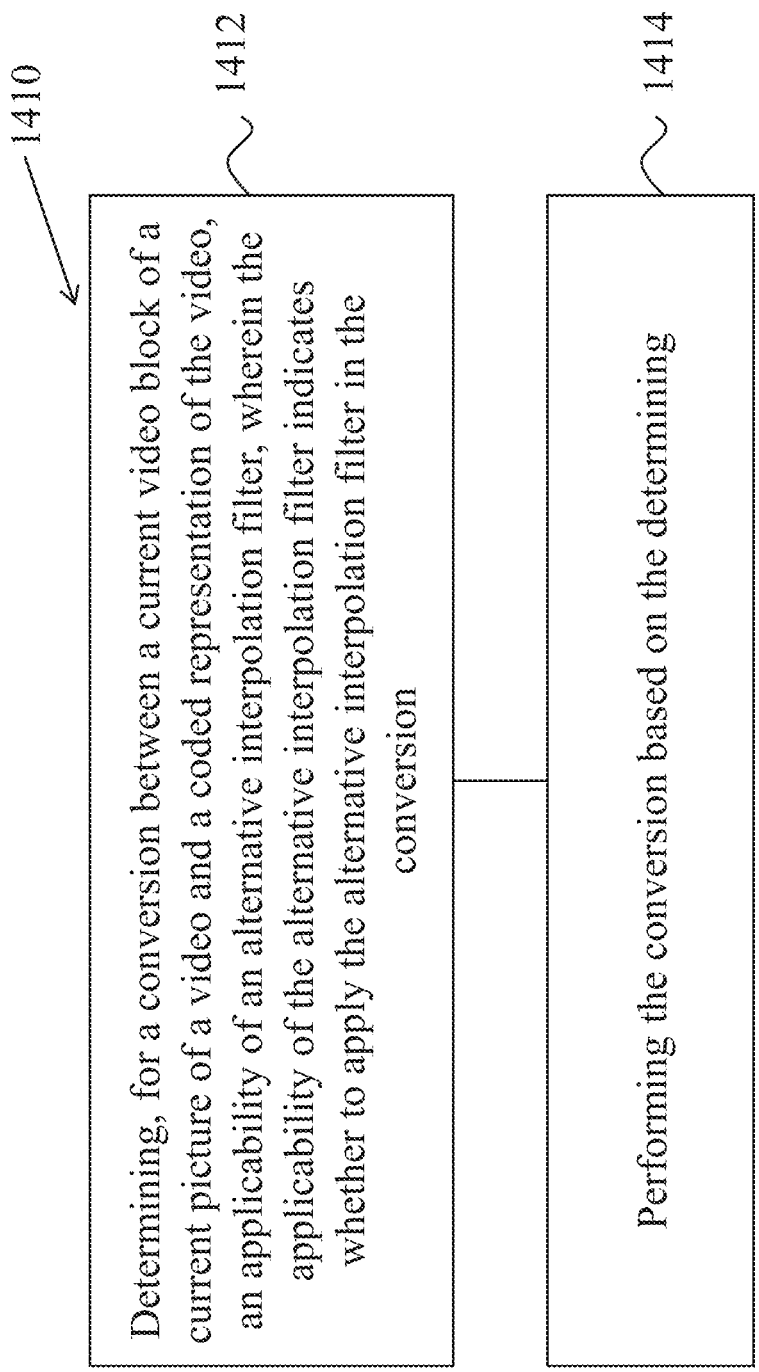

1. A method for video processing (e.g., method 1410 shown in FIG. 14A), comprising: determining (1412), for a conversion between a current video block of a current picture of a video and a coded representation of the video, an applicability of an alternative interpolation filter, wherein the applicability of the alternative interpolation filter indicates whether to apply the alternative interpolation filter in the conversion; and performing (1414) the conversion based on the determining; wherein the applicability of the alternative interpolation filter is determined based on whether a reference picture resampling in which a reference picture of the current picture is resampled to perform the conversion is used.

2. The method of clause 1, wherein the alternative interpolation filter is not applied due to the use of the reference picture resampling.

3. The method of clause 2, wherein the reference picture has a different resolution from that of the current picture.

4. The method of clause 1, wherein a default interpolation filter is applied in case that the determining determines not to apply the alternative interpolation filter.

5. The method of clause 4, wherein the default interpolation filter corresponds to an 8-tap filter with filter coefficients [−1 4 −11 40 40 −11 4 −1].

6. The method of any of clauses 1 to 5, wherein the alternative interpolation filter corresponds to a 6-tap filter with filter coefficients [3 9 20 20 9 3].

7. The method of any of clauses 1 to 6, wherein the alternative interpolation filter is a half-pel interpolation filter used in prediction of the current video block.

8. The method of any of clauses 1 to 7, wherein the current video block is coded with at least one motion vector pointing to a half-pel position if the alternative interpolation filter is used.

9. The method of any of clauses 1 to 8, wherein the current video block is coded with at least one motion vector pointing to a horizontal half-pel position or a vertical half-pel position or a horizontal and vertical half-pel position if the alternative interpolation filter is used.

Figure 14B:
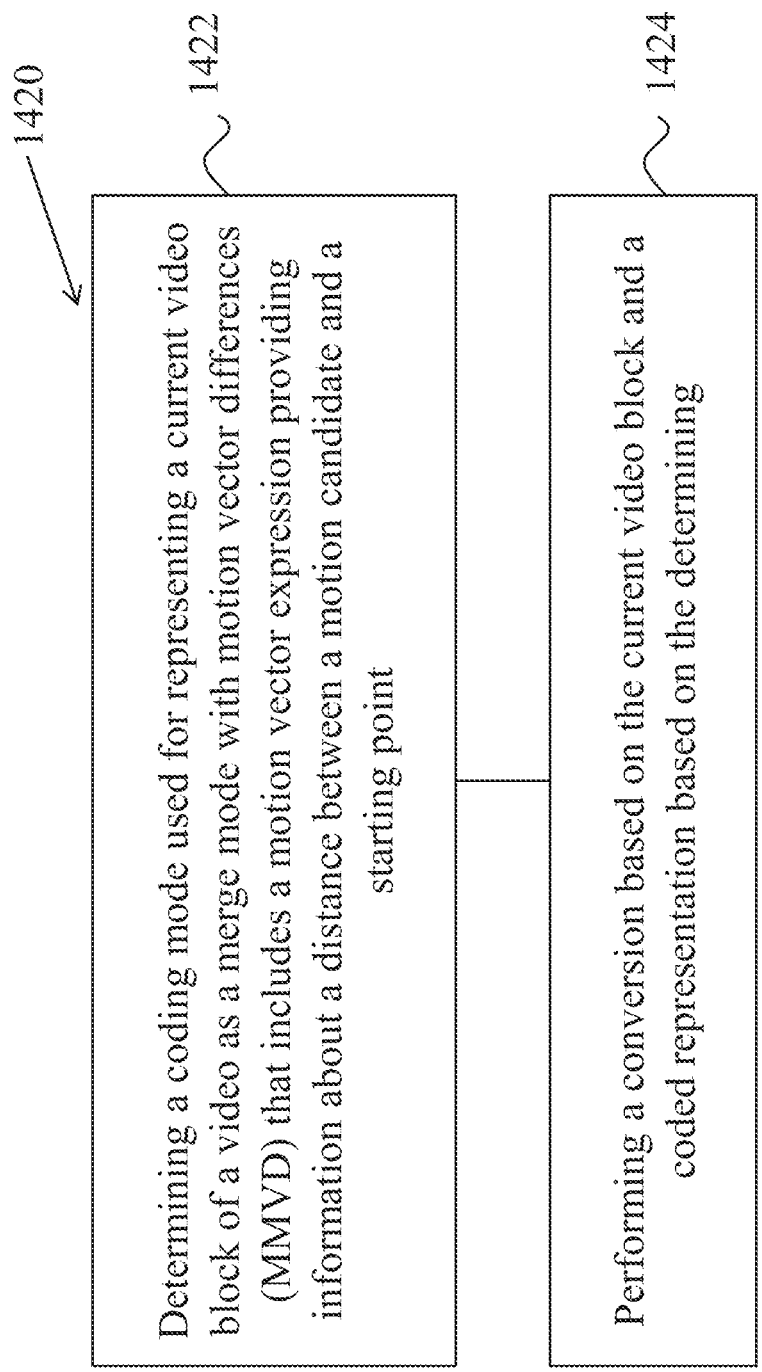

10. A method for video processing (e.g., method 1420 shown in FIG. 14B), comprising: determining (1422) a coding mode used for representing a current video block of a video as a merge mode with motion vector differences (MMVD) that includes a motion vector expression providing information about a distance between a motion candidate and a starting point; and performing (1424) a conversion based on the current video block and a coded representation based on the determining, wherein the conversion is performed using a prediction block for the current video block calculated using a half-pel interpolation filter that is selected according to a first rule that defines a first condition under which the half-pel interpolation filter is an alternative half-pel interpolation filter that is different from a default half-pel interpolation filter and a second rule that defines a second condition about whether the alternative half-pel interpolation filter is inherited.

11. The method of clause 10, wherein the second rule specifies to inherit the alternative half-pel interpolation filter in case that the distance has either an X-pel accuracy or a coarser accuracy than the X-pel accuracy.

12. The method of clause 11, wherein X is ½ and the coarser accuracy is 1, 2, or 4.

13. The method of clause 10, wherein the second rule specifies not to inherit the alternative half-pel interpolation filter in case that the distance has either an X-pel accuracy or a finer accuracy than the X-pel accuracy.

14. The method of clause 13, wherein X is ¼ and the finer accuracy is ¹⁄₁₆.

Figure 14C:
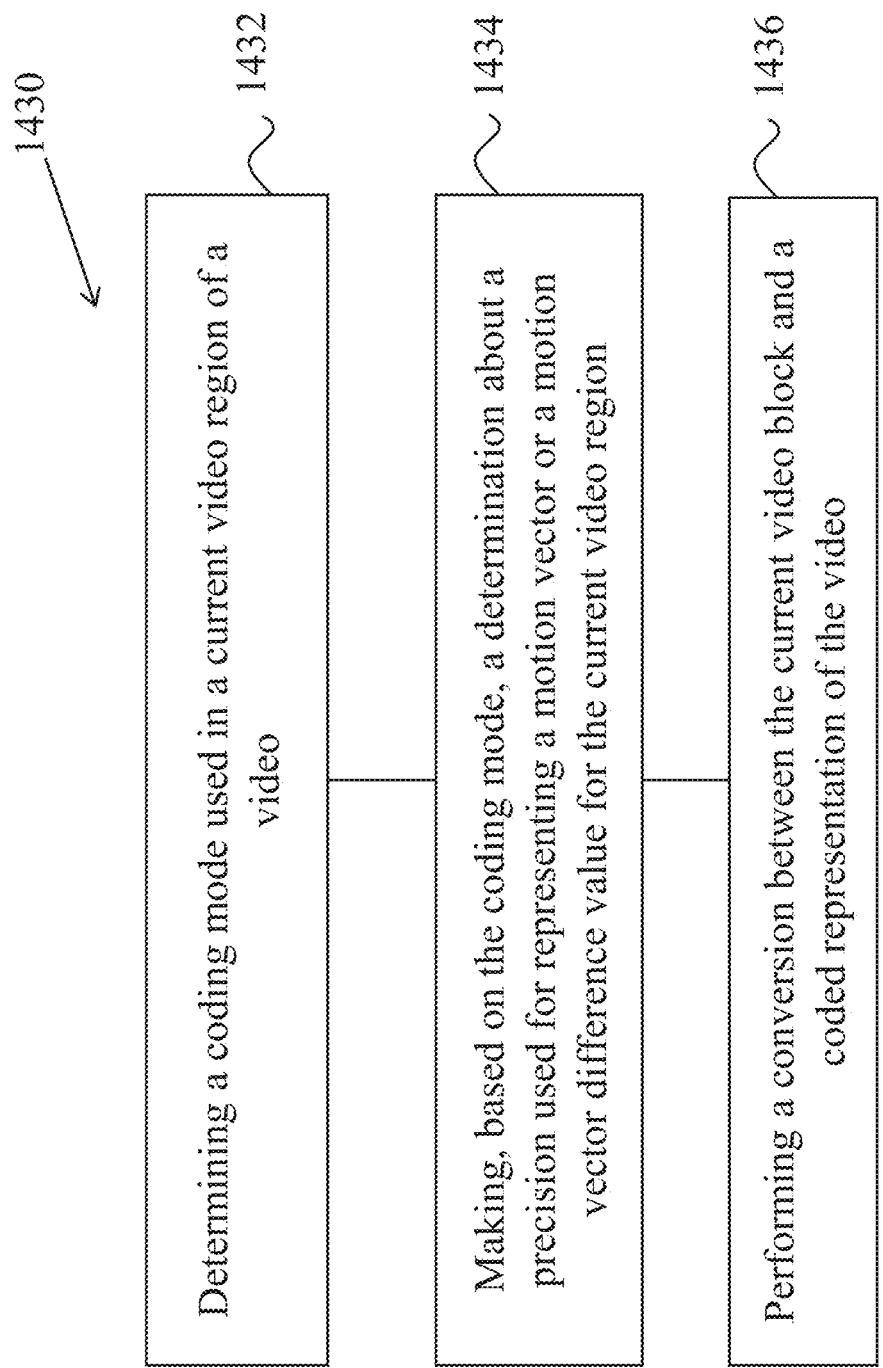

15. A method for video processing (e.g., method 1430 shown in FIG. 14C), comprising: determining (1432) a coding mode used in a current video region of a video; making (1434), based on the coding mode, a determination about a precision used for representing a motion vector or a motion vector difference value for the current video region; and performing (1436) a conversion between the current video block and a coded representation of the video.

16. The method of clause 15, wherein making the determination includes determining whether to inherit the precision.

17. The method of clause 15, wherein in case that the precision is not inherited, the method further includes storing the precision.

18. The method of clause 15, wherein due to the determination that the precision is inherited, the conversion comprises coding the current video region into the coded representation without directly signalling the precision.

19. The method of clause 15, wherein due to the determination that the precision is not inherited, the conversion comprises coding the current video region into the coded representation by signalling the precision.

20. The method of clause 15, wherein the video region corresponds to a video block, coding unit, or a prediction unit.

21. The method of clause 15, wherein the video region corresponds to a coding unit.

22. The method of clause 15, wherein the video region corresponds to a prediction unit.

23. The method of clause 15, wherein the coding mode corresponds to an advanced motion vector prediction (AMVP) mode, an affine inter mode, a merge mode, and/or affine merge mode in which motion candidates are derived from spatial and temporal neighboring blocks.

24. The method of clause 15, wherein, for a candidate derived from a neighboring block, a precision used for representing a motion vector or a motion vector difference value used for the neighboring block is inherited.

25. The method of clause 15, wherein, for a pair-wise merge candidate associated with two spatial merge candidates that are with a same precision, the same precision is allocated to the pair-wise merge candidate, and otherwise, a fixed motion precision information is allocated to the pair-wise merge candidate.

26. The method of clause 15, wherein, for a temporal merge candidate, a fixed precision is allocated.

27. The method of clause 15, further comprising: maintaining, prior to the coding of the current video region or generating of the decoded representation, at least one history-based motion vector prediction (HMVP) table, wherein the HMVP table includes one or more entries corresponding to motion information of one or more previously processed blocks, and wherein the precision is stored in the HMVP table and inherited by a HMVP merge candidate.

28. The method of clause 15, wherein for the current video region coded in a merge mode with motion vector differences (MMVD) in which motion information is updated with motion vector difference, a precision of a base merge candidate is inherited.

29. The method of clause 15 or 16, wherein the precision that has been determined as inherited is used to predict a precision of a subsequent video region.

30. The method of clause 15, wherein a motion vector of a video block coded in a merge mode is rounded to the precision of the current video region.

Figure 14D:
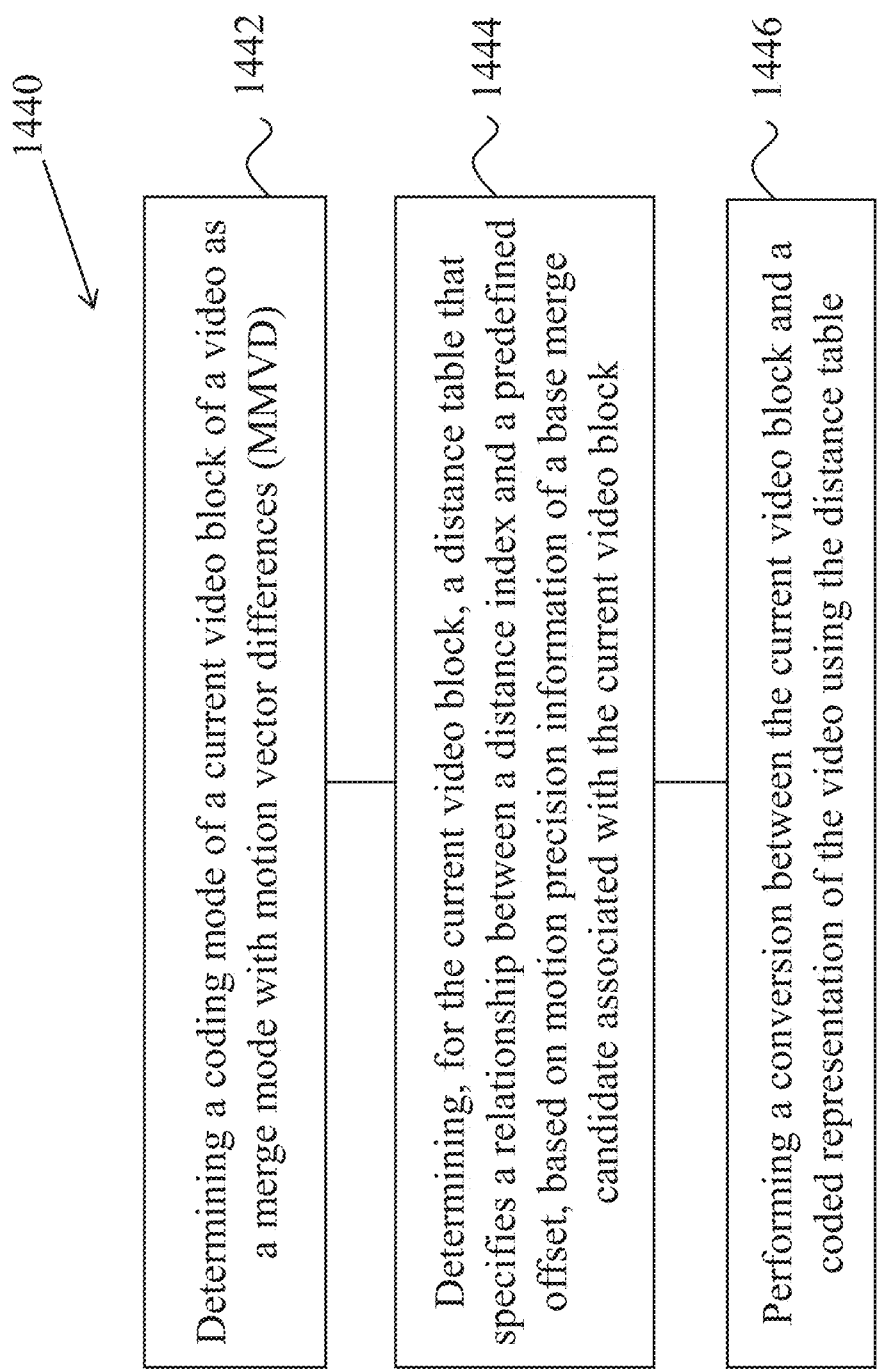

31. A method for video processing (e.g., method 1440 shown in FIG. 14D), comprising: determining (1442) a coding mode of a current video block of a video as a merge mode with motion vector differences (MMVD); determining (1444), for the current video block, a distance table that specifies a relationship between a distance index and a predefined offset, based on motion precision information of a base merge candidate associated with the current video block; and performing (1446) a conversion between the current video block and a coded representation of the video using the distance table.

32. The method of clause 31, wherein a distance with 1/N-pel precision or coarser precision than 1/N-pel is used in case that the base merge candidate has 1/N-pel precision, whereby N is a positive integer.

33. The method of clause 31, wherein N is 2 and the distance is ½-pel, 1-pel, or 2-pel.

34. The method of clause 31, wherein a distance table including a fractional distance is modified based on the motion precision information of the base merge candidate.

35. The method of clause 34, wherein a flag is signalled to indicate whether the fractional distance is allowed for the MMVD mode.

36. The method of clause 34, wherein a distance in the distance table is multiplied by M/N, in case that the base merge candidate has 1/N-pel precision and a finest motion vector difference precision of the distance table has 1/M-pel accuracy, whereby N and M are positive integers.

37. A method for video processing (e.g., method 1450 shown in FIG. 14E), comprising: making (1452) a first determination that a motion vector difference used in a decoder side motion vector refinement (DMVR) calculation for a first video region had a resolution finer than X-pel resolution and was determined using an alternative half-pel interpolation filter, wherein X is an integer fraction; making (1454) a second determination, due to the first determination, that information of the alternative half-pel interpolation filter associated with the first video region is not to be stored or made available to a second video region that is subsequently processed; and performing (1456) a conversion between a video comprising the first video region and the second video region and a coded representation of the video based on the first determination and the second determination.

38. The method of clause 37, wherein the video region corresponds to a video block, a coding unit, or a prediction unit.

39. The method of clause 37, wherein the second determination is made for each sub-block of the video in case that the a DMVR is performed at a sub-block level.

40. The method of clause 37, wherein the motion vector difference has the resolution finer than X-pel resolution for at least N of sub-blocks or blocks of the video.

Figure 14F:
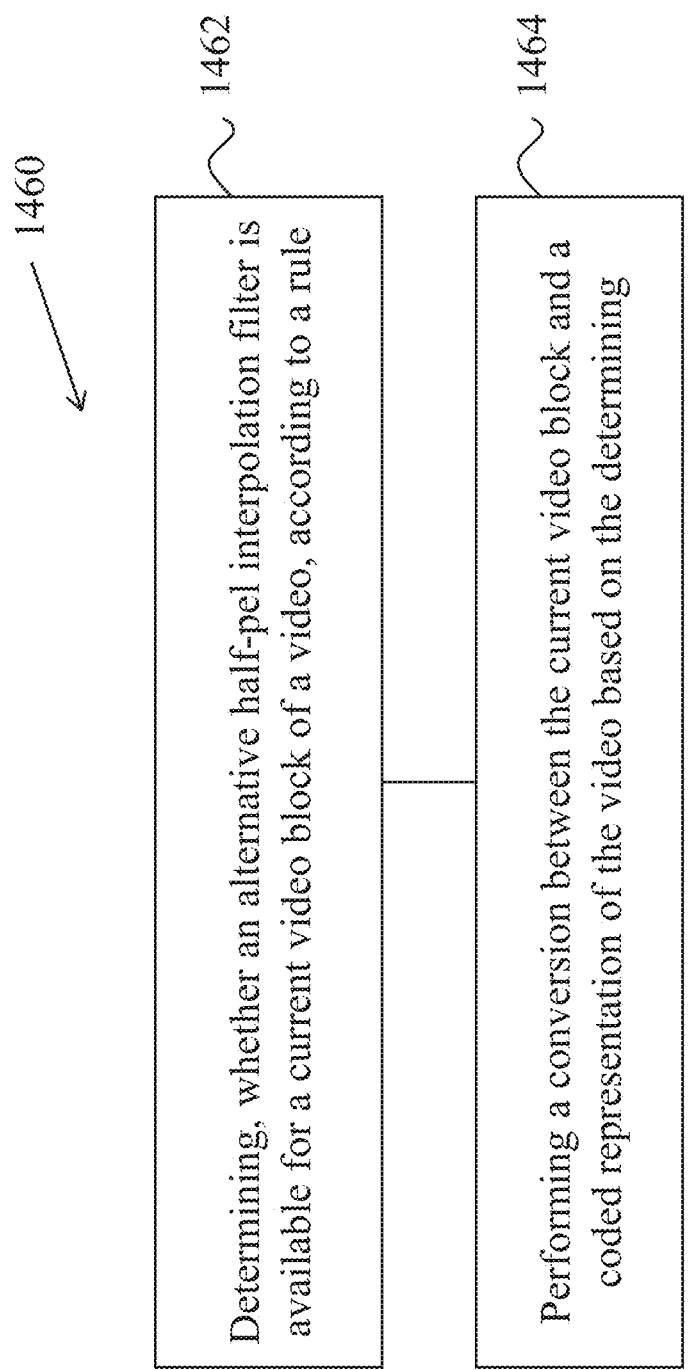

41. A method for video processing (e.g., method 1460 shown in FIG. 14F), comprising: determining (1462), whether an alternative half-pel interpolation filter is available for a current video block of a video, according to a rule; performing (1464) a conversion between the current video block and a coded representation of the video based on the determining; wherein the rule specifies that, in case that the current video block is coded in the coded representation as a merge block or a skip coded block, the determining is independent of whether the alternative half-pel interpolation filter is used for processing a previous block that is encoded or decode prior to the current video block.

42. The method of clause 41, wherein a parameter identifying whether the alternative half-pel interpolation filter is used for the conversion is not stored for any block of the video.

43. The method of clause 41, wherein whether to inherit or discard the alternative half-pel interpolation filter depends on coding information, and/or coding tools enabled or disabled in the current video block.

44. A method for video processing (e.g., method 1460 shown in FIG. 14F), comprising: determining (1462), whether an alternative half-pel interpolation filter is available for a current video block of a video, according to a rule; and performing (1464) a conversion between the current video block and a coded representation of the video based on the determining, wherein the rule specifies an applicability of the alternative half-pel interpolation filter that is different from a default interpolation filter based on coding information of the current video block.

45. The method of clause 44, wherein the current video block is coded in the coded representation as a merge block or a skip coded block.

46. The method of clause 44, wherein in case that the coded representation includes a merge index that is equal to K, the alternative half-pel interpolation filter is applied in the current video block coded in a merge or skip mode, whereby K is a positive integer.

47. The method of clause 44, wherein in case that the coded representation includes a merge index, Idx, that satisfies Idx % S is equal to K, the alternative half-pel interpolation filter is applied in the current video block coded in a merge or skip mode, whereby S and K are positive integers.

48. The method of clause 44, wherein the alternative half-pel interpolation filter is applied to a specific merge candidate.

49. The method of clause 48, wherein the specific merge candidate corresponds to a pair-wise merge candidate.

Figure 14G:
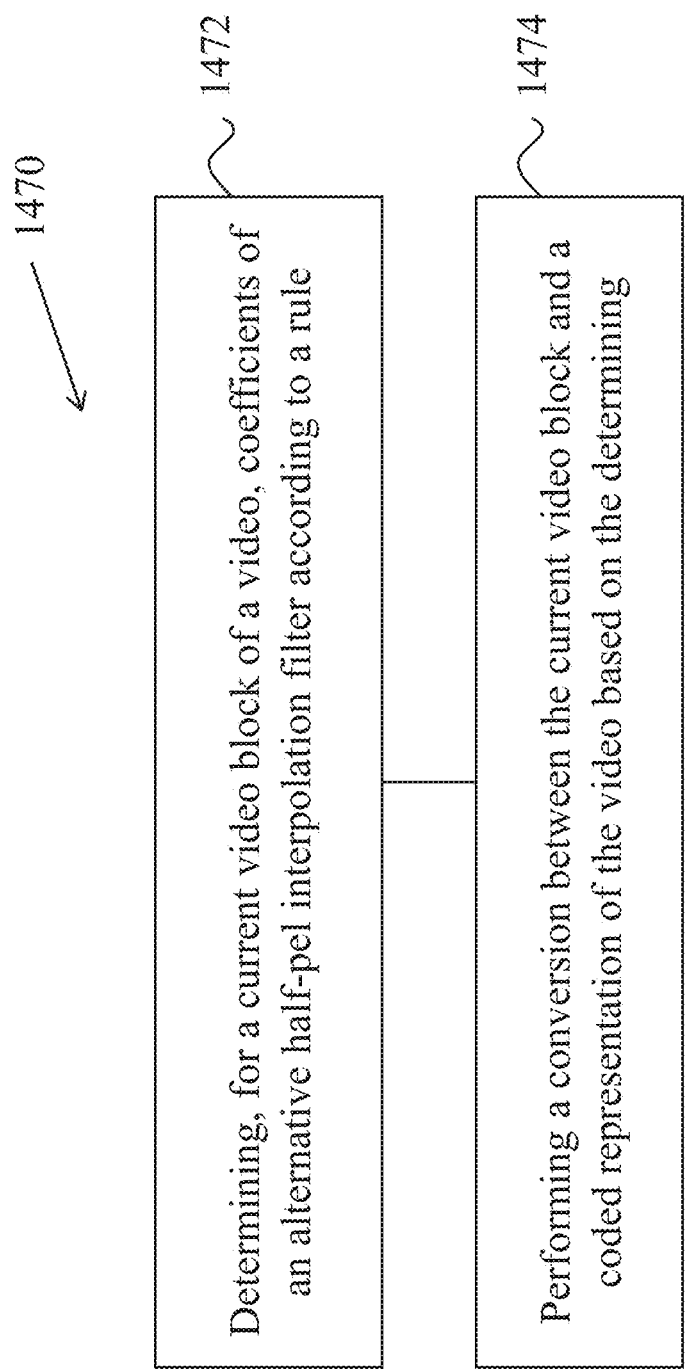

50. A method for video processing (e.g., method 1470 shown in FIG. 14G), comprising: determining (1472), for a current video block of a video, coefficients of an alternative half-pel interpolation filter according to a rule; and performing (1474) a conversion between the current video block and a coded representation of the video based on the determining, wherein the rule specifies a relationship between the alternative half-pel interpolation filter and a half-pel interpolation filter used in a certain coding mode.

51. The method of clause 50, wherein the rule specifies that the alternative half-pel interpolation filter is aligned with the half-pel interpolation filter used in an affine interprediction.

52. The method of clause 51, wherein the alternative interpolation filter has a coefficient set that is [3, −11, 40, 40, −11, 3].

53. The method of clause 51, wherein the alternative interpolation filter has a coefficient set that is [3, 9, 20, 20, 9, 3].

54. The method of clause 50, wherein the rule specifies that the alternative half-pel interpolation filter is identical to the half-pel interpolation filter used in chroma inter-prediction.

55. The method of clause 54, wherein the alternative interpolation filter has a coefficient set that is [−4, 36, 36, −4].

Figure 14H:
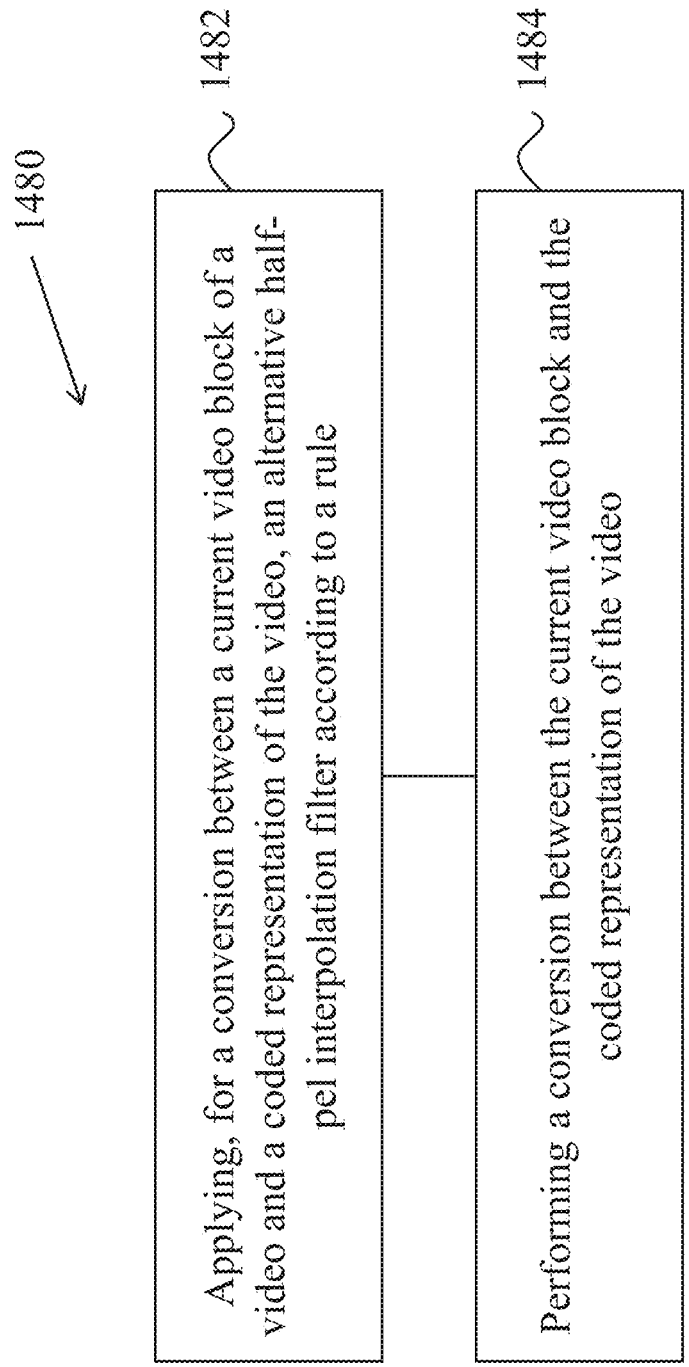

56. A method for video processing (e.g., method 1480 shown in FIG. 14H), comprising: applying (1482), for a conversion between a current video block of a video and a coded representation of the video, an alternative half-pel interpolation filter according to a rule; and performing (1484) a conversion between the current video block and the coded representation of the video, and wherein the rule specifies that the alternative interpolation filter is applied to a position at X-pel, wherein X is other than ½.

57. The method of clause 56, wherein use of the alternative interpolation filter is explicitly or implicitly indicated.

58. The method of clause 57, wherein the alternative interpolation filter has at least one coefficient different from coefficients of a default interpolation filter that has been assigned to the position at X-pel.

59. The method of clause 56, wherein the applying of the alternative half-pel interpolation filter is performed after decoder-side motion vector refinement (DMVR), or merge mode with motion vector differences (MMVD), or symmetric motion vector differences (SMVD), or other decoder side motion derivation process.

60. The method of clause 56, wherein the applying of the alternative half-pel interpolation filter is performed in case that a reference picture resampling (RPR) is used for and that a reference picture has a different resolution from that of a current picture including the current video block.

61. The method of any of clauses 56 to 60, wherein the alternative half-pel interpolation filter is applied only to one prediction direction in case that the current video block uses a bi-prediction.

62. A method for video processing (e.g., method 1490 shown in FIG. 14I): making (1492) a first determination that an alternative interpolation filter is selected by a first video block of a video for a first motion vector component with an X-pel accuracy; making (1494) a second determination, due to the first determination, that another alternative interpolation filter is used for a second motion vector component with an accuracy that is different from the X-pel accuracy, wherein X is an integer fraction; and performing (1496) a conversion between the video comprising the first video block and the second video block and a coded representation of the video.

63. The method of clause 62, wherein the alternative interpolation filter and the another alternative interpolation filter correspond to Gaussian interpolation filters.

64. The method of clause 62, wherein the alternative interpolation filter and the another alternative interpolation filter correspond to Flattop interpolation filters.

65. The method of clause 62, wherein the second motion vector component has the accuracy that is finer than the X-pel accuracy.

66. The method of clause 62, wherein to the second motion vector component has the accuracy that is coarser than the X-pel accuracy.

67. The method of any of clauses 1 to 66, wherein performing the conversion includes generating the coded representation from the current video block.

68. The method of any of clauses 1 to 66, wherein performing the conversion includes generating the current video block from the coded representation.

69. An apparatus in a video system comprising a processor and a non-transitory memory with instructions thereon, wherein the instructions upon execution by the processor, cause the processor to implement the method in any one of clauses 1 to 68.

70. A computer program product stored on a non-transitory computer readable media, the computer program product including program code for carrying out the method in any one of clauses 1 to 68.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of the present disclosure. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   determining, for a conversion between a current video block of a current picture of a video and a bitstream of the video, whether to use a first half-pel interpolation filter or a second half-pel interpolation filter based on whether a reference picture resampling tool is enabled; and
   performing the conversion based on the determining.

2. The method of claim 1, wherein the first half-pel interpolation filter is not applied to the current video block based on enabling of the reference picture resampling tool.

3. The method of claim 1, wherein the second half-pel interpolation filter other than the first half-pel interpolation filter is applied to the current video block based on enabling of the reference picture resampling tool.

4. The method of claim 1, wherein a half-pel precision interpolation filter index of the first half-pel precision interpolation filter is equal to 1; and wherein a half-pel precision interpolation filter index of the second half-pel precision interpolation filter is equal to 0.

5. The method of claim 1, wherein if the reference picture resampling tool is enabled, a resolution of the current picture is different than that of a reference picture of the current video block.

6. The method of claim 3, wherein the second interpolation filter corresponds to an 8-tap filter with filter coefficients [−1 4 −11 40 40 −11 4 −1].

7. The method of claim 1, wherein the first interpolation filter corresponds to a 6-tap filter with filter coefficients [3 9 20 20 9 3].

8. The method of claim 1, wherein the current video block is coded with at least one motion vector pointing to a half-pel position if the first half-pel interpolation filter is used.

9. The method of claim 1, wherein the current video block is coded with at least one motion vector pointing to a horizontal half-pel position or a vertical half-pel position or a horizontal and vertical half-pel position if the first half-pel interpolation filter is used.

10. The method of claim 1, wherein the conversion comprises encoding the current video block into the bitstream.

11. The method of claim 1, wherein the conversion comprises decoding the current video block from the bitstream.

12. An apparatus for processing video data comprising a processor and a non-transitory memory with instructions thereon, wherein the instructions upon execution by the processor, cause the processor to:
   determine, for a conversion between a current video block of a current picture of a video and a bitstream of the video, whether to use a first half-pel interpolation filter or a second half-pel interpolation filter based on whether a reference picture resampling tool is enabled; and
   perform the conversion based on the determining.

13. The apparatus of claim 12, wherein the first half-pel interpolation filter is not applied to the current video block based on enabling of the reference picture resampling tool.

14. The apparatus of claim 12, wherein the second half-pel interpolation filter other than the first half-pel interpolation filter is applied to the current video block based on enabling of the reference picture resampling tool.

15. The apparatus of claim 12, wherein a half-pel precision interpolation filter index of the first half-pel precision interpolation filter is equal to 1 and a half-pel precision interpolation filter index of the second half-pel precision interpolation filter is equal to 0.

16. The apparatus of claim 14, wherein if the reference picture resampling tool is enabled, a resolution of the current picture is different than that of a reference picture of the current video block.

17. The apparatus of claim 14, wherein the second interpolation filter corresponds to an 8-tap filter with filter coefficients [−1 4 −11 40 40 −11 4 −1]; and the first interpolation filter corresponds to a 6-tap filter with filter coefficients [3 9 20 20 9 3].

18. A non-transitory computer-readable storage medium storing instructions that cause a processor to:
   determine, for a conversion between a current video block of a current picture of a video and a bitstream of the video, whether to use a first half-pel interpolation filter or a second half-pel interpolation filter based on whether a reference picture resampling tool is enabled; and perform the conversion based on the determining.

19. The non-transitory computer-readable storage medium of claim 18, wherein the first half-pel interpolation filter is not applied to the current video block based on enabling of the reference picture resampling tool.

20. A non-transitory computer-readable recording medium storing a bitstream of a video which is generated by a method performed by a video processing apparatus, wherein the method comprises:
 determining, for a current video block of a current picture of a video, whether to use a first half-pel interpolation filter or a second half-pel interpolation filter based on whether a reference picture resampling tool is enabled; and
 generating the bitstream based on the determining.

\* \* \* \* \*